US012706914B2

(12) United States Patent
Sienicki et al.

(10) Patent No.: US 12,706,914 B2
(45) Date of Patent: Aug. 11, 2026

(54) METHOD AND SYSTEM FOR SECURE CONTAINER APPLICATION FRAMEWORK

(71) Applicant: VEEA INC., New York, NY (US)

(72) Inventors: Jim Sienicki, New York, NY (US); Roger Lucas, New York, NY (US); Perry Wintner, New York, NY (US); Nick Jelbert, New York, NY (US); Clint Smith, New York, NY (US)

(73) Assignee: VEEA INC., New York, NY (US)

( * ) Notice: Subject to any disclaimer, the term of this patent is extended or adjusted under 35 U.S.C. 154(b) by 145 days.

(21) Appl. No.: 18/890,821

(22) Filed: Sep. 20, 2024

(65) Prior Publication Data

US 2025/0016161 A1 Jan. 9, 2025

Related U.S. Application Data

(63) Continuation of application No. 17/592,667, filed on Feb. 4, 2022, now Pat. No. 12,126,622.

(Continued)

(51) Int. Cl.

*H04L 9/40* (2022.01)
*G06F 11/1446* (2026.01)

(Continued)

(52) U.S. Cl.

CPC ........ *H04L 63/101* (2013.01); *G06F 11/1464* (2013.01); *G06F 11/1469* (2013.01); *G06F 21/105* (2013.01); *H04L 63/0435* (2013.01); *H04L 63/102* (2013.01); *H04L 63/20* (2013.01); *H04L 67/1097* (2013.01); *G06F 21/1075* (2023.08)

(58) Field of Classification Search

None

See application file for complete search history.

(56) References Cited

U.S. PATENT DOCUMENTS 12,015,613 B2 * 6/2024 Sienicki ................ H04L 63/123
12,126,622 B2 * 10/2024 Sienicki ................ G06F 21/105

(Continued)

OTHER PUBLICATIONS

European Patent Office, "International Search Report and Written Opinion," issued in related International Patent Application No. PCT/US2022/015403, mailed May 19, 2022 (13 pages).

(Continued)

*Primary Examiner* — Ponnoreay Pich

(74) *Attorney, Agent, or Firm* — The Marbury Law Group, PLLC

(57) ABSTRACT

An edge computing gateway (ECG) includes a processor configured to establish a distributed container network that includes a plurality of interconnected ECGs, each of which includes an orchestrator and containers. The processor may determine available resources on one or more additional ECGs in the distributed container network, select one of the additional ECGs in the distributed container network to run a container based on the available resources determined by the orchestrator of the ECG, and allocate resources from the selected ECG to execute the container. In response to changes in resource demands, the processor may dynamically reallocate resources between the ECG and the selected ECG to adjust container performance across the distributed container network.

27 Claims, 25 Drawing Sheets

Related U.S. Application Data

(60) Provisional application No. 63/166,421, filed on Mar. 26, 2021, provisional application No. 63/146,884, filed on Feb. 8, 2021.

(51) Int. Cl.
*G06F 21/10* (2013.01)
*H04L 67/1097* (2022.01)

(56) References Cited

U.S. PATENT DOCUMENTS

| | | | |
|---|---|---|---|
| 2014/0282586 | A1 | 9/2014 | Shear et al. |
| 2015/0256481 | A1 * | 9/2015 | Turovsky ................ H04L 47/83 709/226 |
| 2018/0083971 | A1 | 3/2018 | Brown et al. |
| 2018/0137296 | A1 | 5/2018 | Cahana et al. |
| 2018/0270290 | A1 | 9/2018 | Sinha et al. |
| 2018/0316725 | A1 | 11/2018 | Mani et al. |
| 2019/0208009 | A1 * | 7/2019 | Prabhakaran ........... H04L 67/51 |
| 2019/0311146 | A1 | 10/2019 | Garcia et al. |
| 2020/0136920 | A1 * | 4/2020 | Doshi ..................... H04L 41/16 |
| 2020/0195495 | A1 * | 6/2020 | Parker ..................... H04L 41/40 |
| 2020/0334371 | A1 | 10/2020 | Stoler et al. |
| 2022/0255941 | A1 | 8/2022 | Sienicki et al. |
| 2025/0016161 | A1 * | 1/2025 | Sienicki ................ G06F 21/105 |

OTHER PUBLICATIONS

European Patent Office, "International Preliminary Report on Patentability and Written Opinion," issued in related International Patent Application No. PCT/US2022/015403 dated Aug. 3, 2023, (8 pages).
"U.S. Appl. No. 17/592,632," filed Feb. 4, 2022, (100 pages).
"U.S. Appl. No. 17/592,667," filed Feb. 4, 2022, (98 pages).

* cited by examiner

900

801 User

901 Container Manager

805 Security Daemon

807 Image Store

903 HW Manager

905 Backup and Restore Manager

907 Keystore Manager

902 Start

910 Start Container From Image X

912 Request Metadata for Image X

914 Metadata Content

904 Configure

916 Configure Host for Image

918 Check Metadata Integrity
Extract Licenses from Metadata
Check Image Permissions
Create User/Group Accounts
Update System Service ACLs

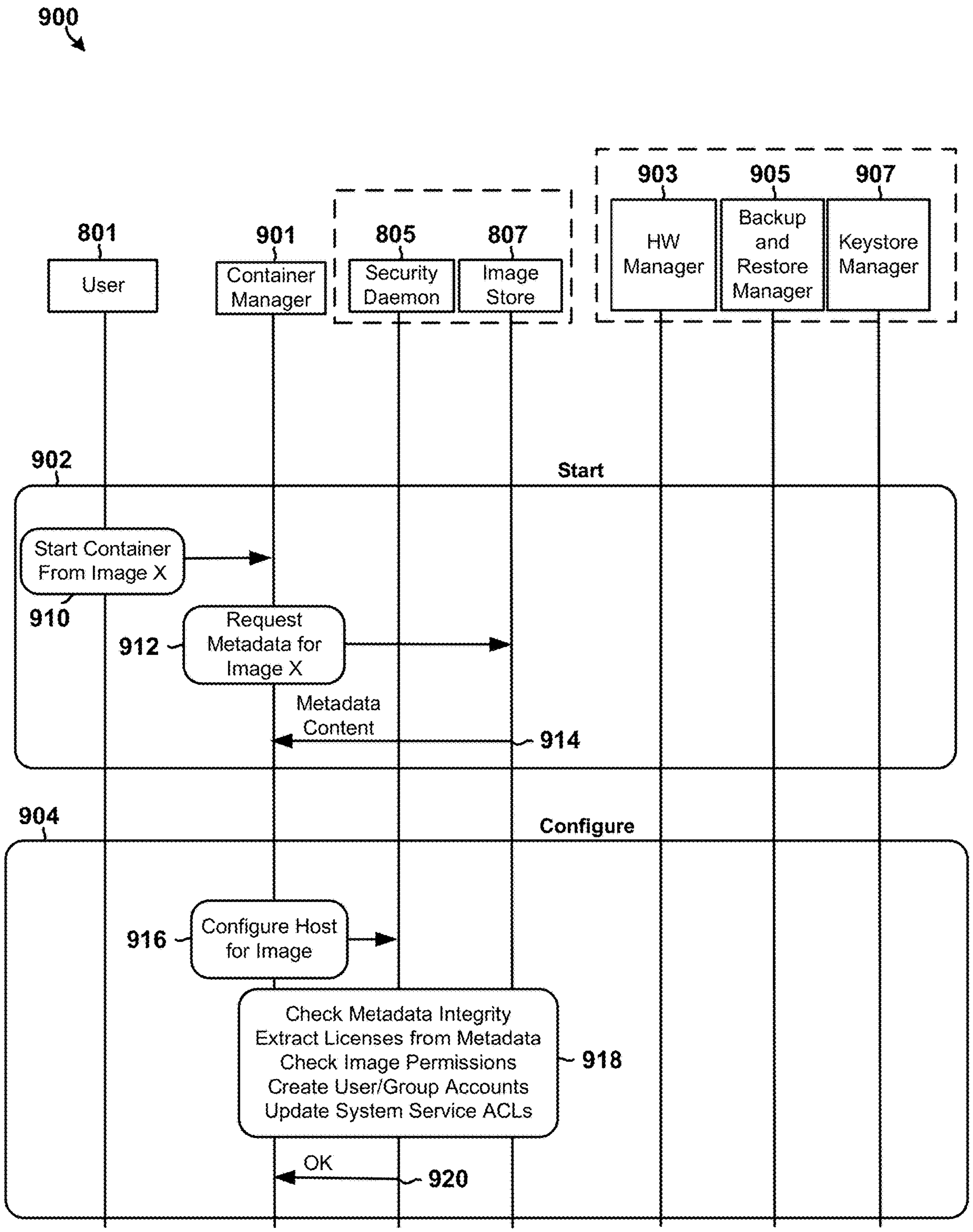

FIG. 9A

METHOD AND SYSTEM FOR SECURE CONTAINER APPLICATION FRAMEWORK

RELATED APPLICATIONS

This application claims priority to U.S. Non-Provisional application Ser. No. 17/592,667 entitled "Method and System for Secure Container Application Framework", filed Feb. 4, 2022 which claims the benefit of priority to U.S. Provisional Application No. 63/146,884, entitled "Method and System for Secure Container Application Framework" filed Feb. 8, 2021, and U.S. Provisional Application No. 63/166,421, entitled "Method and System for Secure Container Application Framework" filed Mar. 26, 2021, the entire contents of all of which are hereby incorporated by reference for all purposes.

BACKGROUND

In recent years, edge devices and/or edge computing solutions have emerged that aim to improve the user experience by allowing computing systems to offload computation-intensive tasks from user devices to the edge devices, thereby freeing up resources on the user devices and/or allowing the user devices to perform more computations or more resource-intensive tasks. Edge devices may also improve the user experience by performing computations at the edge of the network (instead of relying on a cloud service, etc.), thereby reducing network congestion and improving response times through lower latency and local computing power.

Concurrent with these trends, containers have begun making headway into the wireless telecom space in recent years. A container may be one of a plurality of isolated user space instances operating on the kernel, each of which operates under the illusion of having full or exclusive access to the processors, peripherals, memory and I/O of the computing system. Application programs running inside of a container generally only see the container's contents and devices assigned to that container.

Containers have many advantages that could help enable the delivery of services for wireless operators and/or improve the performance and/or function of edge devices. As such, new and improved solutions that improve the security, efficiency, and/or functionality of containers and/or which allow containers to be more readily used on edge devices will be beneficial to wireless operators, device manufacturers, and consumers.

SUMMARY

The various aspects include methods of generating a secure container to perform a software application on an edge device, which may include receiving, by a security daemon operating on a processor of the edge device, a configure host request message from a container manager, determining, by the security daemon, integrity of metadata, extracting licenses from the metadata, determining image permissions, creating a user or group account, and updating one or more system service access-control lists (ACLs) in response to receiving the configure host request message from the container manager, and generating and sending, by the security daemon, a configure host response message to the container manager.

Some aspects may include receiving, by the security daemon, a resource preparation request message from a container manager, communicating, by the security daemon, with a hardware manager to determine hardware access in response to receiving the resource preparation notification message from the container manager, obtaining, by the security daemon, container keys and identity from a keystore manager in response to determining suitable hardware is accessible using, by the security daemon, the obtained the container keys and identity to determine a container configuration from a backup and restore manager, assigning, by the security daemon, resources to the container based on the determined container configuration, and generating and sending, by the security daemon, a resource preparation response message to the container manager for use in starting a container.

Some aspects may include starting, by the container manager, the container to operate on the edge device. Some aspects may include creating, by the container manager, a namespace for the container by communicating with a secure container platform, and preparing, by the container manager, a file system for the container and file system overlays in which the container runs, by communicating with an image store. In some aspects creating the namespace for the container may include creating a security enclave in which the container will operate.

Some aspects may include communicating, by the container manager, with the secure container platform to map resources. Some aspects may include automatically and dynamically delivering networking capabilities to the container.

Further aspects may include a computing device (e.g., edge device, etc.) having a processor configured with processor-executable instructions to perform various operations corresponding to the methods discussed above.

Further aspects may include a computing device (e.g., edge device, etc.) having various means for performing functions corresponding to the method operations discussed above.

Further aspects may include a non-transitory processor-readable storage medium having stored thereon processor-executable instructions configured to cause a processor in a computing device (e.g., edge device, etc.) to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

FIGS. 9A through 9C are process flow diagrams illustrating a method of creating a secure container in accordance with some embodiments.

DETAILED DESCRIPTION

Figure 1A:
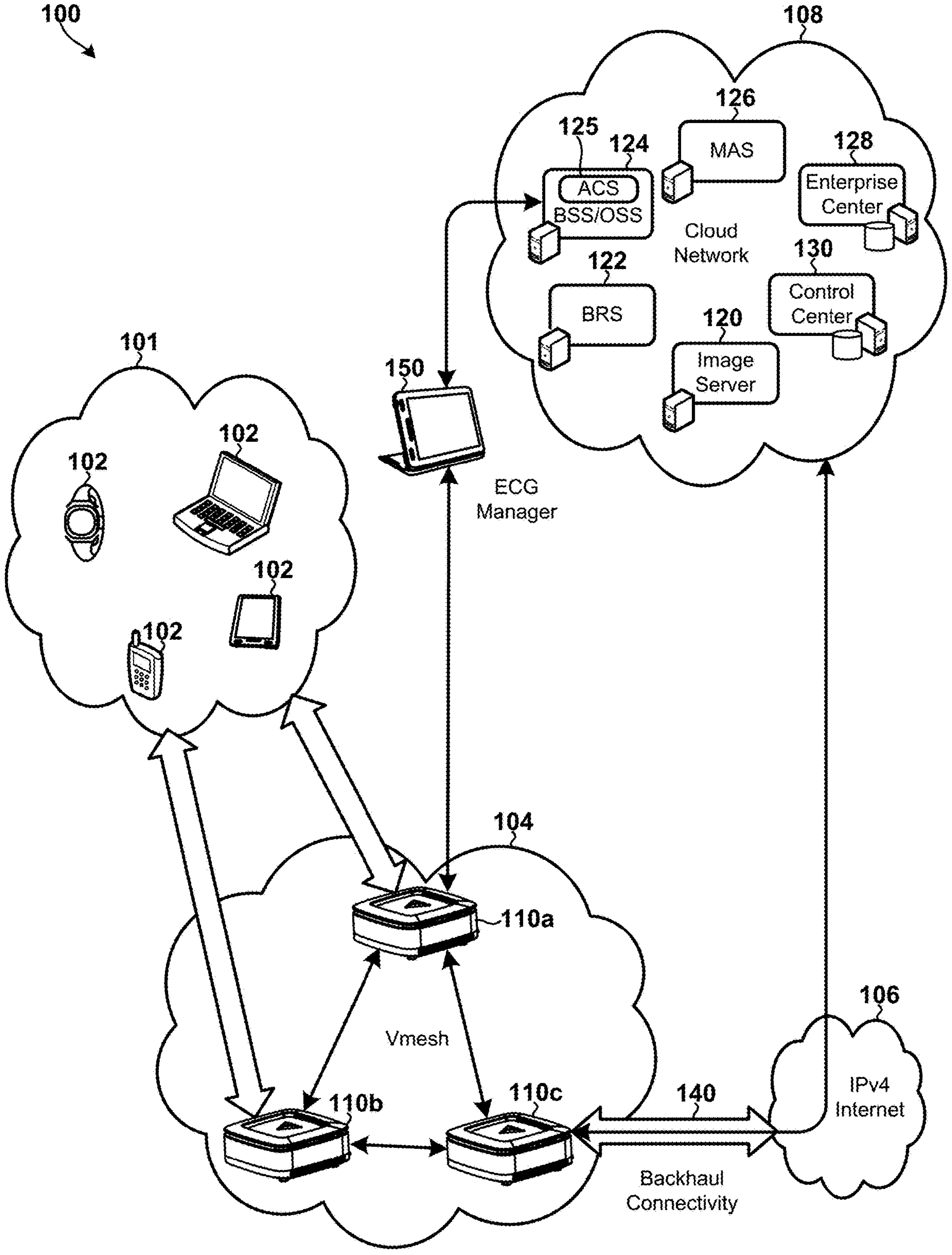
FIG. 1A is a component block diagram illustrating an example system that includes an edge computing gateway (ECG) and which could be used to implement various embodiments.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include systems and components (e.g., ECGs, etc.) configured to create and use licenses and secure containers to run software applications at the edge of the network and/or to implement a secure container framework for running all or portions of a software application at the edge of the network.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The terms "computing device," "user device," "end user devices," and "user computing device" may be used herein to refer to any one or all of quantum computing devices, edge devices, Internet access gateways, modems, routers, network switches, residential gateways, access points, integrated access devices (IAD), mobile convergence products, networking adapters, multiplexers, personal computers, laptop computers, tablet computers, user equipment (UE), smartphones, personal or mobile multi-media players, personal data assistants (PDAs), palm-top computers, wireless electronic mail receivers, multimedia Internet enabled cellular telephones, gaming systems (e.g., PlayStation™, Xbox™, Nintendo Switch™, etc.), wearable devices (e.g., smartwatch, head-mounted display, fitness tracker, etc.), IoT devices (e.g., smart televisions, smart speakers, smart locks, lighting systems, smart switches, smart plugs, smart doorbells, smart doorbell cameras, smart air pollution/quality monitors, smart smoke alarms, security systems, smart thermostats, etc.), media players (e.g., DVD players, ROKU™, AppleTV™, etc.), digital video recorders (DVRs), automotive heads up displays, portable projectors, 3D holographic displays, and other similar devices that include a programmable processor and communications circuitry for providing the functionality described herein.

The term "network function virtualization (NFV)" may be used herein to refer to components, systems and technologies that leverage virtualization techniques to enable existing network infrastructure (both user and control plane) to be consolidated and virtualized so that it may operate in a virtualized environment on commodity hardware. In contrast, the term "virtualized network function (VNF)" may refer a component, system, or network element that may be included and used as part of a NFV solution to implement a network function. For example, a VNF may be a software implementation of a network function that may be deployed on virtualized infrastructure (e.g., compute, storage, and network).

The term "container" may used herein to refer to a software component that supports virtualization technology, enables the abstraction (or virtualization) of computing resources, implements a sandbox, and/or separates software applications from their underlying infrastructure (thus making them infrastructure agnostic). For example, a container may be one of a plurality of isolated user space instances operating on the kernel, each of which operates under the illusion of having full or exclusive access to the processors, peripherals, memory and I/O of the computing system. Application programs running inside of a container may only see the container's contents and devices assigned to that container. In addition to these isolation mechanisms, a container or kernel may include resource-management features that limit the impact of one container's activities on other containers.

The term "microservice" may be used herein to refer to a small or lightweight application that is loosely coupled with other services, independently deployable and easily testable. A microservice may be housed in a VNF, container, or other constructs such as a virtual machine (i.e., VMware) or a Linux User space component.

The term "computing mesh" may be used herein to refer to any or a variety of techniques and technologies for distributing or linking various computing resources that are connected by wireless or wired communication links, but which are not otherwise connected to each other. This may include a software defined network in which computing resources are located in one node/component and the data used for the program or application resides in another node/component as part of the computing mesh. A computing mesh typically utilizes a self-organizing network in which computing resources are shared between different nodes in a computing mesh environment.

The term "application mesh" may be used herein in to refer to any or a variety techniques and technologies used for running and executing applications across different physical devices. The devices may be connected via wireless or wired communication links, or a combination thereof. An application mesh may include different components or processes of the application running on different nodes/components based on computing resources, sensors, or auxiliary devices attached to each node/component, enabling the application to utilize all the resources it needs to perform the functions of the application using different nodes/components concurrently.

The term "connectivity mesh" may be used herein in to refer to any or a variety of techniques and technologies used for connecting different computing platforms for the ability to share computing resources, run and execute applications, or provide connectivity with other devices or systems. The connectivity mesh may also be a self-organizing network (SON) network, with an ability to adapt and provide the optimum connectivity based on node/component availability, latency and other parameters necessary to sharing computing resources, performing application mesh techniques or providing a self healing backbone for delivering and receiving information.

The term "edge computing" may be used herein to refer to systems, techniques or technologies that improve the user experience by offloading computation-intensive tasks from user devices to edge devices or servers deployed at the edge of the networks, thereby freeing up resources on user devices and/or allowing the user device to perform more computations or more resource-intensive tasks. Edge computing may be regarded as a new paradigm for overcoming resource shortages on resource-constrained user computing devices.

The terms "edge device," "edge compute device," and "edge computing device" may be used interchangeably herein to refer to a computing device that is configured to perform or implement edge computing techniques or technologies. An edge device may include a programmable processor, various memories, and communications circuitry for establishing communication links to user devices (e.g., smartphones, UEs, IoT devices, etc.) and/or to network components in a service provider, core, cloud, or enterprise network. An edge device may include or implement functionality associated any one or all of an access point, gateway, modem, router, network switch, residential gateway, mobile convergence product, networking adapter, customer premise device, multiplexer and/or other similar devices.

Edge devices and/or edge computing solutions may improve the user experience by allowing computing systems to offload computation-intensive tasks from user devices to the edge devices, thereby freeing up resources on the user devices and/or allowing the user devices to perform more computations or more resource-intensive tasks. Edge devices may also improve the user experience by performing computations at the edge of the network (instead of relying on a cloud service, etc.), thereby reducing network congestion and improving response times through lower latency and local computing power. However, despite these benefits, conventional edge devices may be resource constrained devices and/or prone to experience resource poverty, which may limit the type of applications that run on user devices and/or otherwise negate or degrade any improvements to the user experience. In addition, compute resources and wireless capacity at the edge typically cannot be increased on demand, resulting in either (a) a reduction in the offered load or (b) an increase in queueing at the edge device. Further, edge devices may also be constrained devices in that they have minimal flexibility for resolving peak demand requests.

In addition, conventional solutions may require a system administrator to configure and manage the deployment of services. Using system administration for configuring and managing services may work in small deployments or scale-out replication of fixed configurations where nothing is changed. However, when the configuration is variable, the use of the system administration to configure and manage the deployment services may not only be cumbersome, inefficient, and not highly scalable, it may also increase security vulnerabilities.

Further, conventional container platforms (e.g., Docker) may implement a conventional orchestration architecture that requires many parameters to be manually applied including the storage configuration, network access, etc. that are applied by a sysadmin with global privileges on the edge device. However, applying configuration changes using conventional approaches does not scale and presents security vulnerabilities (e.g., when there are thousands or more edge devices, all with their different configuration requirements, etc.).

The embodiments include, provide, configure and/or use an edge computing gateway (ECG) (e.g., a VEEAHUB, etc.) that uses licenses, labels and secure containers to overcome these and other limitations of existing and conventional solutions.

Figure 1B:
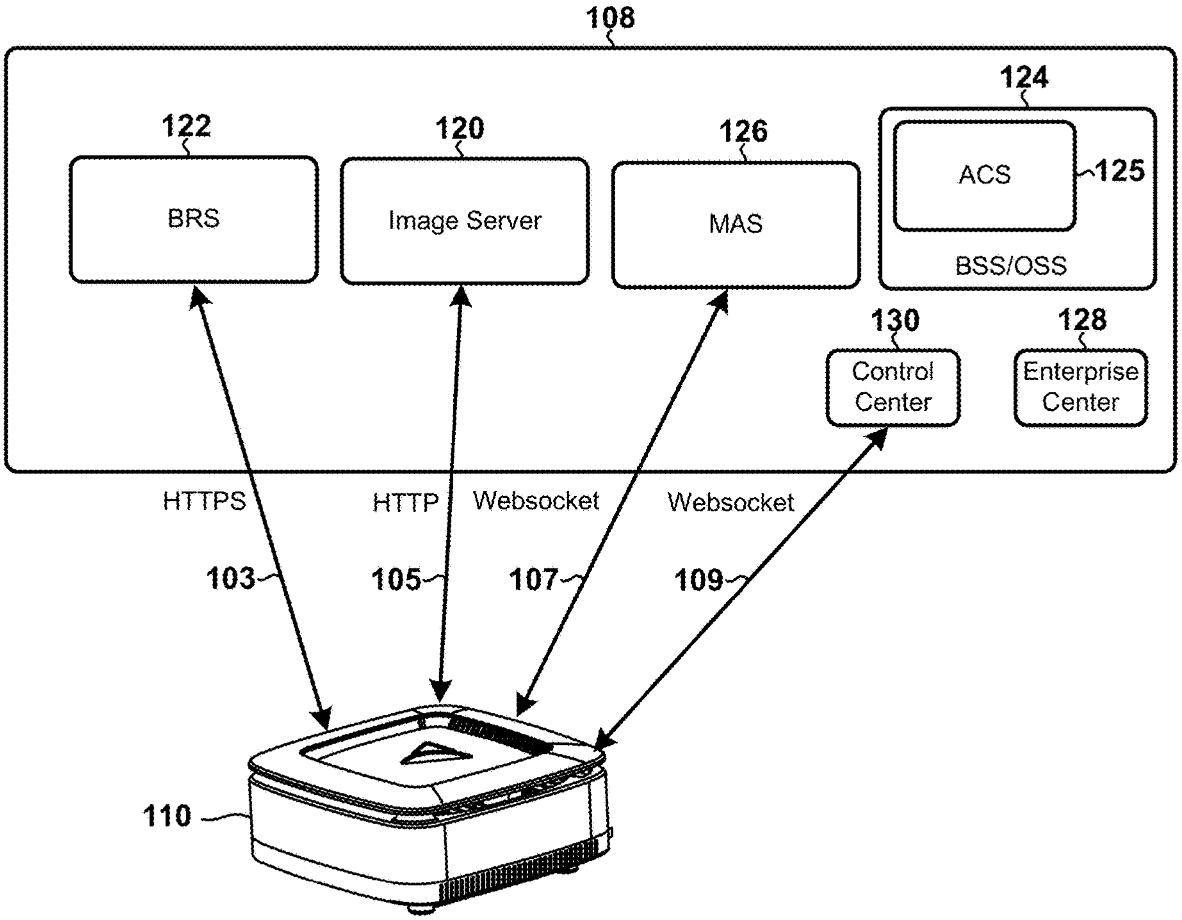
FIG. 1B is a component block diagram illustrating a cloud network that could be configured to working in conjunction with an ECG in accordance with various embodiments.

FIGS. 1A and 1B illustrate example networks 100 that include edge computing gateways (ECGs) that could be used to implement container security in accordance with some embodiments. In the example illustrated in FIG. 1A, the network 100 includes a network 101 of peripheral devices 102, a distributed container network or Vmesh 104, an Internet Protocol version 4 (IPv4) network 106, a cloud network 108, and an ECG manager 150. The Vmesh 104 includes multiple ECGs 110 (e.g., ECG 110*a*, 110*b*, and 110*c*) that are connected to each either via wired or wireless communication links (e.g., Wi-Fi, ethernet, etc.). The cloud network 108 includes an image server 120, a bootstrap and recovery server (BRS) 122, a business/operations support system (BSS/OSS) server 124 that includes an activation and configuration service (ACS) 125, a management and authentication server (MAS) 126, an enterprise center 128, and/or a control center (CC) 130.

In the example illustrated in FIG. 1B, the cloud network 108 includes the ACS 125, image server 120, BRS 122, BSS/OSS 124, MAS 126, enterprise center 128, control center 130, and. The ECG 110 includes a Hypertext Transfer Protocol Secure (HTTPS) 103 link to the BRS 122, a Hypertext Transfer Protocol (HTTP) 105 link to the image server 120, a websocket 107 link to the MAS 126, and another websocket 107 link to the control center 130.

The peripheral devices 102 may include any of a variety of peripherals or user devices, such as smartphones, laptops, IoT devices, POS equipment, screens, speakers, servers, printers, etc.

The Vmesh 104 may include a collection of ECGs 110 that are connected together through meshing technology to form a network. The Vmesh 104 links may be Wi-Fi or ethernet based. The routing within the Vmesh 104 may be adaptable depending upon the current mesh topology. In some embodiments, the Vmesh 104 may be a connectivity mesh, a computing mesh and/or an application mesh.

An ECG 110 (e.g., ECGs 110*a-c*) may be an on-premise edge device or edge computing technology system that is equipped with computing and storage resources that are able to support flexible deployments and/or the operation of multi-ecological services in the user site. For these and other reasons, an ECG 110 may enable a vertical industry's Internet transformation.

Each ECG 110 may include a processer, operating system, memory/storage, a number of connectivity options, and various other hardware and/or software components. One or more of the software components in the ECGs 110 may be Linux-based and/or split into discrete user spaces, or containers, through the use of a secure container environment (e.g., Docker, etc.). A container may be an individual instance of an application. One image of an application may be used by many instances of that application. This allows multiple containers to use the same image at the same time, improving its efficiency. In addition, the containers may be isolated from each other because they can have their own software, libraries and configuration files to run the application itself. Further, because containers are created from images, the image may contain specific content detailing exactly how the container, application, is supposed to function and behave.

The containers may be platform-based or application-based. Platform-based containers may include services or functionality necessary for the operation of the ECG 110. Application-based containers may be optional addon services or functionality. The deployment and use of the various application containers may be controlled from the cloud network 108 via the MAS 126 and the control center 130. Examples of application containers include: (1) public Wi-Fi functionality for clients connected to the ECG 110, (2) home automation services (HASS) such as home assistants, etc., and (3) secure messaging services within the Vmesh 104.

An ECG 110 may be configured to communicate with the peripheral devices 102 and other ECGs 110. In addition, the ECGs 110 may be configured to permit 3rd party applications to run on them, allowing developers to tailor functionality to a specific use case or component (e.g., a Wi-Fi access point, an IoT server or gateway, etc.). In the example illustrated in FIG. 1A, ECG 110*a* and ECG 110*b* are mesh nodes (MNs), and ECG 110*c* is a mesh edge node (MEN). While both the MEN and MN are ECGs 110, only the MEN has backhaul connectivity 140 (e.g., cellular, Wi-Fi, ethernet, etc.) to the IPv4 network 106.

In some embodiments, the ECG 110 may be classified as an edge computing device with a Lightweight Virtualization Framework (LVF). Using the LVF, the ECG 110 may implement and enable many applications using a compute distribution method. The use of a LVF may also enable the ECG 110 to implement applications as local containers. The ECG 110 may pool resources available between connected ECGs 110 to create a larger container environment with each container running on a local ECG 110 in a distributed edge container method.

One of the ECG's 110 unique aspects is that of the containerized environment, allowing for the development and deployment of additional discrete services or functionality on the ECG 110 or Vmesh 104. These applications may be deployed to an ECG 110 in one of two principal ways, namely from the application store or via package selection and the BRS 122 as previously described.

The ECG manager 150 may be configured to provide configuration and diagnostic functionality for the ECGs 110. In some embodiments, the ECG manager 150 may include two principal functions: to set up and configure the ECGs 110, and to obtain status information from them. The ECG manager 150 may be used by ECG 110 owners, or provisioning operatives, to register the ECG 110 with the manufacturer, obtain the necessary licenses, and/or add the ECG 110 to the control center 130 and/or MAS 126 so that it may be configured and monitored. In some embodiments, the ECG manager 150 may be configured to communicate with the ACS 125 through a HTTPS rest interface, which may in turn communicate with the control center 130 and/or MAS 126. In some embodiments, the ECG manager 150 and/or components in the cloud network 108 may be configured to communicate with the ECGs 110 (e.g., through a hidden and secured Wi-Fi access point, etc.). In some embodiments, the ECG manager 150 may not strictly be part of either the Vmesh 104 or the cloud network 108, but rather, a configuration and diagnostic tool for the ECGs 110*a-c*. In some embodiments, the ECG manager 150 may be a mobile application (e.g., for iOS and Android devices, etc.).

The cloud network 108 may include all the servers, user interfaces and services required to deploy, authenticate and manage the Vmesh 104 and associated ECGs 110.

The image server 120 may be an application server. In some embodiments, the image server 120 may include an application, system platform software, system updates, operating system updates, software updates, and/or other package updates.

The image server 120 may provide the actual software for the bootloader, recovery, system and container images in the form of "tar.gz" files. The image server 120 may include multiple versions of an image, without maintaining responsibility for defining which versions are downloaded to a particular ECG 110. Rather, this may be governed by "receipts" that are provided to the BRS 122 and MAS 126 by the ACS 125 for that ECG 110.

In some embodiments, the image server 120 may be an HTTP content delivery network (CDN), and the software images stored there may be encrypted. When a software image is uploaded to the image server 120, a random URL may be used and a random cipher may be generated. The details of the image URL and the cipher may be signed by a private key and form part of the package that is pushed to the BRS 122. During bootstrap, the ECG 110 may verify the integrity of the URL and cipher information, download the image using HTTP plaintext, and decrypt the image using the random cipher.

The BRS 122 may be configured to provide "receipts" for the ECG 110 software including the bootloader image, the recovery image, the system image and the container images, as well as configuration files which include the MAS URL and credentials, mesh configuration, and location and cipher information for the image files. The actual software images themselves may be stored on the image server 120, which may be in a different physical location than the BRS 122. The image receipts may be pushed to the BRS 122 by the ACS 125 and are encrypted using the ECG's public key. When the ECGs 110 are first powered on, or at a later date when a re-bootstrap process is initiated, the ECG 110 may connect to the BRS 122 and download the software receipts and configuration from which it is able to obtain the actual software images from the image server 120. An ECG 110 coming into service may require the system image and the platform container images.

The BSS/OSS server 124 may include the ACS 125. In some embodiments, the ACS 125 may be part of an image delivery system. For example, the ACS 125 may control what images are pushed down to the ECG 110. In some embodiments, the ACS 125 may be configured to configure the ECGs 110, BRS 122, MAS 126, and/or control center 130. The ACS 125 may support enrolment by providing APIs to the mobile ECG manager 132. The ACS 125 may support package selection by providing APIs for the control center 130. The ACS 125 may define a "package" by a package description, the platform software load, the containers and their software load and any additional metadata of relevance. The platform software may a system image whilst the containers may include all the platform containers, i.e., system, database and network, along with licensed application containers associated with the package. For instance, a "premium" package may include a number of application containers, whilst a "basic" package may include very few. The package may also include a configuration that defines the operation and behavior of the downloaded package, the MAS URL and security credentials, and the mesh configuration. This package may be pushed to the BRS 122 by the ACS 125. As mentioned previously, the software source itself does not reside on the BRS 122, but on the image server 120, and hence what is pushed to the BRS 122 is actually a "receipt" which tells the ECG 110 where to go to obtain the software and configuration.

The MAS 126 may include a connection to the ECG 110 and/or a router that is configured to perform message routing between the MAS 126 and the ECG 110. The MAS 126 may be configured to implement a device management solution for the ECG 110, monitor or track the current state of all Vmesh 104 and ECGs 110, collect and store time-based analytics for the Vmesh 104 and ECGs 110, and/or to provide the ECGs 110 with authentication and management, always-on connectivity, application service downloads, and/or application service upgrades. In some embodiments, the MAS 126 may include a registry with application container images. The Vmesh 104 and/or ECGs 110 may download images from the registry using a remote API, procedure call, service or function (e.g., "create service," "upgrade service," etc.). For example, an image may be downloaded to the MEN (e.g., ECG 110*c* illustrated in FIG. 1, etc.), which may propagate the image throughout the Vmesh 104.

The enterprise center 128 and/or control center 130 may include user interfaces to the end customer. For example, the control center 130 may be a consumer or user interface portal to the owners' ECGs 110 and Vmesh 104. This provides the ability to monitor and manage devices and applications in a similar manner to the MAS 126 and enterprise center 128, but at a more restricted level, and not on a fleet basis. The control center 130 may also allow the package selection i.e., system image, platform and application containers, available or configured to operate on an ECG 110 or Vmesh 104. The control center 130 may interact with the ACS 125. In some embodiments, the control center 130 may include a one-way interaction with the MAS 126, where it performs a primitive "get" operation to retrieve the group, mesh and node databases from the MAS 126. If package selection is performed in the control center 130, then this information may be provided to the ACS 125 which in turn sends a refresh trigger to the MAS 126 once it has pushed the package selection to the BRS 122.

In some embodiments, the BRS 122, image server 120, MAS 126, and the ACS 125 may represent back-end services. For example, in some embodiments, the ACS 125 may be the backend of a MAS control center.

Figure 2:
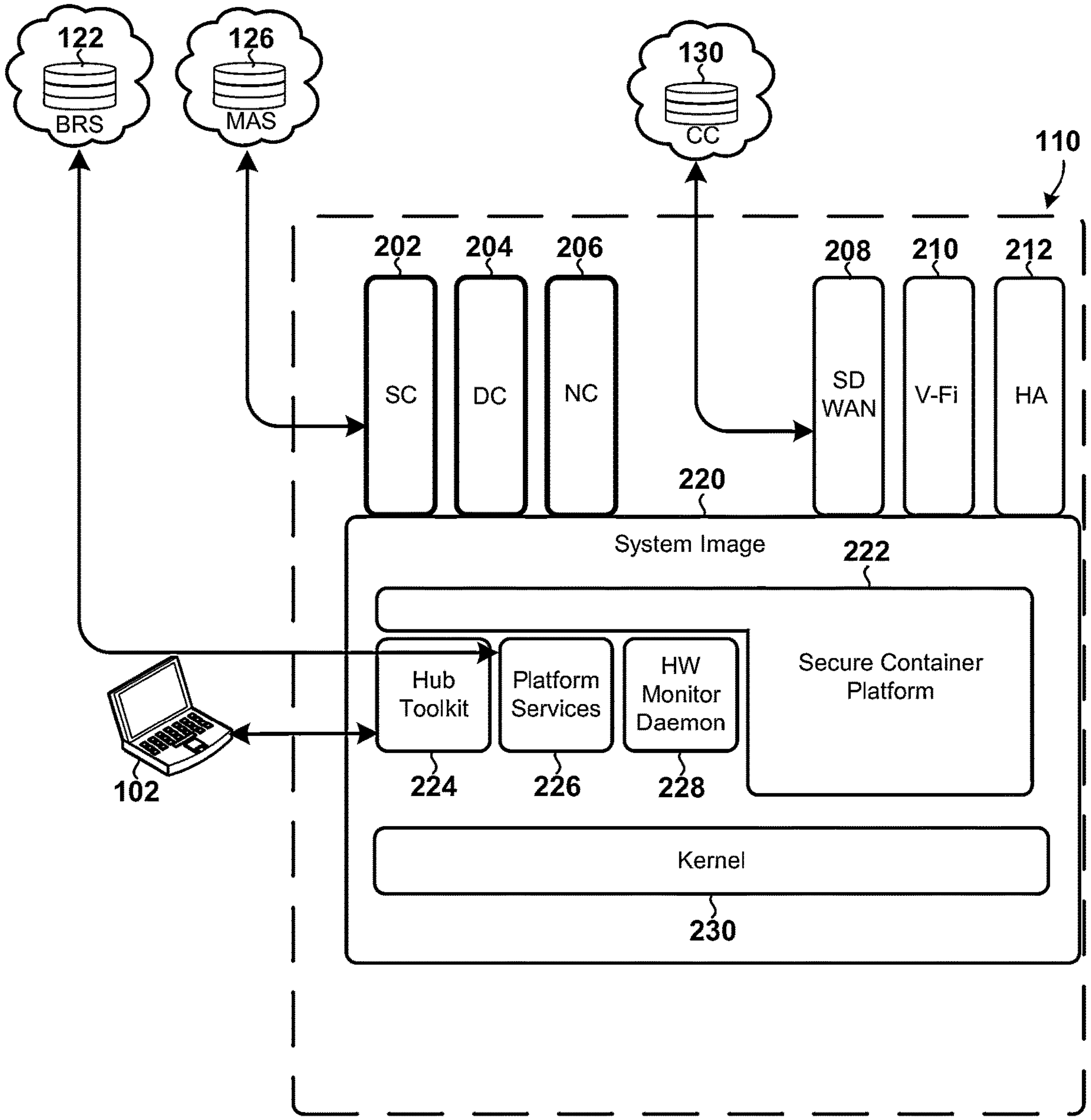
FIG. 2 is a component block diagram illustrating an example ECG system that could be configured in accordance with various embodiments.

FIG. 2 illustrates various components that could be included in and/or used by an ECG 110. In the example illustrated in FIG. 2, the ECG 110 includes a system container (SC) 202, a database container (DC) 204, a network container (NC) 206, a SD-WAN 208 component, a V-Fi 208 component, home assistant (HA) 212 component, and a system image 220. The system image 220 may include a secure container platform 222, a hub toolkit 224, a platform services 226 component, a hardware (HW) monitor daemon 228, and a kernel 230. In some embodiments, the ECG 110 may include communication links between the hub toolkit 224 and the peripheral device 102, the platform services 226 component and the BRS 122, the system container 202 and the MAS 126, and/or the control center 130 and the SD-WAN 208 component.

In some embodiments, the secure container platform 222 may be a secure docker platform. In some embodiments, V-Fi 210 may be an implementation of access point (AP) guest Wi-Fi functionality.

In some embodiments, the secure container platform 222 solution may be configured to implement security restrictions on containers. These security restrictions may ensure that the source of a container may be authenticated, ensure that the integrity of the container may be validated, ensure that containers are only run in the ways intended by the container developer, ensure that containers are only run-in ways as approved by the manufacturer/vendor, and/or ensure that containers do not interfere with the host or other containers (both running processes and data). In some embodiments, the secure container platform 222 may be configured so that the security restrictions do not prevent reasonable operation of the containers, do not prevent approved access to devices, and/or do not prevent a developer from debugging processes running within their container or the startup and shutdown of their container.

The secure container platform 222 may deploy and manage containers at the edge so that they scale properly, without the need of using sysadmin to configure the edge devices. In some embodiments, the secure container platform 222 may remove the need for a sysadmin to configure the edge devices by defining: a set of rules to describe how the container should be deployed; a set of constraints for the access that the container has to local hardware, networking, and resources; a set of APIs for the containers to interact with the management framework at the edge and dynamically reconfigure their behavior based on the local environment, within the limitations on the above rules and constraints; a secure multi-tenant execution environment so that containers can isolate or share resources, based on the above rules and constraints as set by the original developer of the container; and a security model that encompasses the origin of the container, the integrity of the container image, and the validity the above rules, constraints, and execution environment.

The secure container platform 222 may be configured to use labels so as to enable it to be backwards compatible with the existing container specifications. A secure container platform 222 container may be run on a conventional or normal container platform, but may lose the advanced capabilities afforded by secure container platform 222. Conversely a normal container may be run on the secure container platform 222, for which the secure container platform 222 may apply a default set of rules and constraints.

The secure container framework 222 may be configured to grab several images for a scalable deployment of containers, thereby eliminating the requirement of using a system admin to create policies. In addition, systems and components configured in accordance with the various embodiments may use keys and licenses to eliminate the requirement of using a system admin, to allow applications from different 3rd parties to operate within the system without interfering with one another, to control what the software applications see on the ECGs (e.g., what hardware/services they see, etc.), to control access and use of the services and hardware, and/or to prevent the unauthorized access or use of any of the services or hardware. For example, a client software application that wants to make use of a blue tooth device has to first obtain a license to access Bluetooth. After obtaining the license, the client software application may access the Bluetooth resources identified in or permitted by the obtained license.

The secure container platform 222 may be implemented and used in any or all container environments that need enhanced security when deploying services dynamically.

In some embodiments, the platform and/or application containers of an ECG 110 may be governed by the secure container platform 222, the security methodology used, and also connect to cloud services in the cloud network 108.

Some embodiments may include a container of vmesh containers (vCON) that is configured to utilize at its base a Docker environment and/or the secure container platform 222, and to run component like the ECG 110. The ECG 110 may be configured to ensure that the containers it runs are suitably constrained and present a low risk to the host integrity as well as the integrity of other containers.

Some embodiments may provide security enhancements for containers (e.g., vCON, etc.) via the secure container platform 222 and/or via implementing security through labels in a container platform image JavaScript Object Notation (JSON). The use of labels in the image JSON may ensure particular security restrictions are taken into account while not impeding the functionality of containers.

In some embodiments, the secure container platform 222 solution may be configured to use existing features to add security to the system, such as by putting in special labels and generating, installing, implementing, and/or enforcing restrictions or licenses.

In some embodiments, the cloud network 108 may be part of the overall secure container platform 222 architecture. The cloud network 108 may be a collection of software and server functionality that is provided to enable deployment, authentication and management of the Vmesh 104 and associated ECGs 110. The components of the cloud network 108 are typically, although not necessarily, co-located and are often situated in a cloud computing domain.

Figure 3:
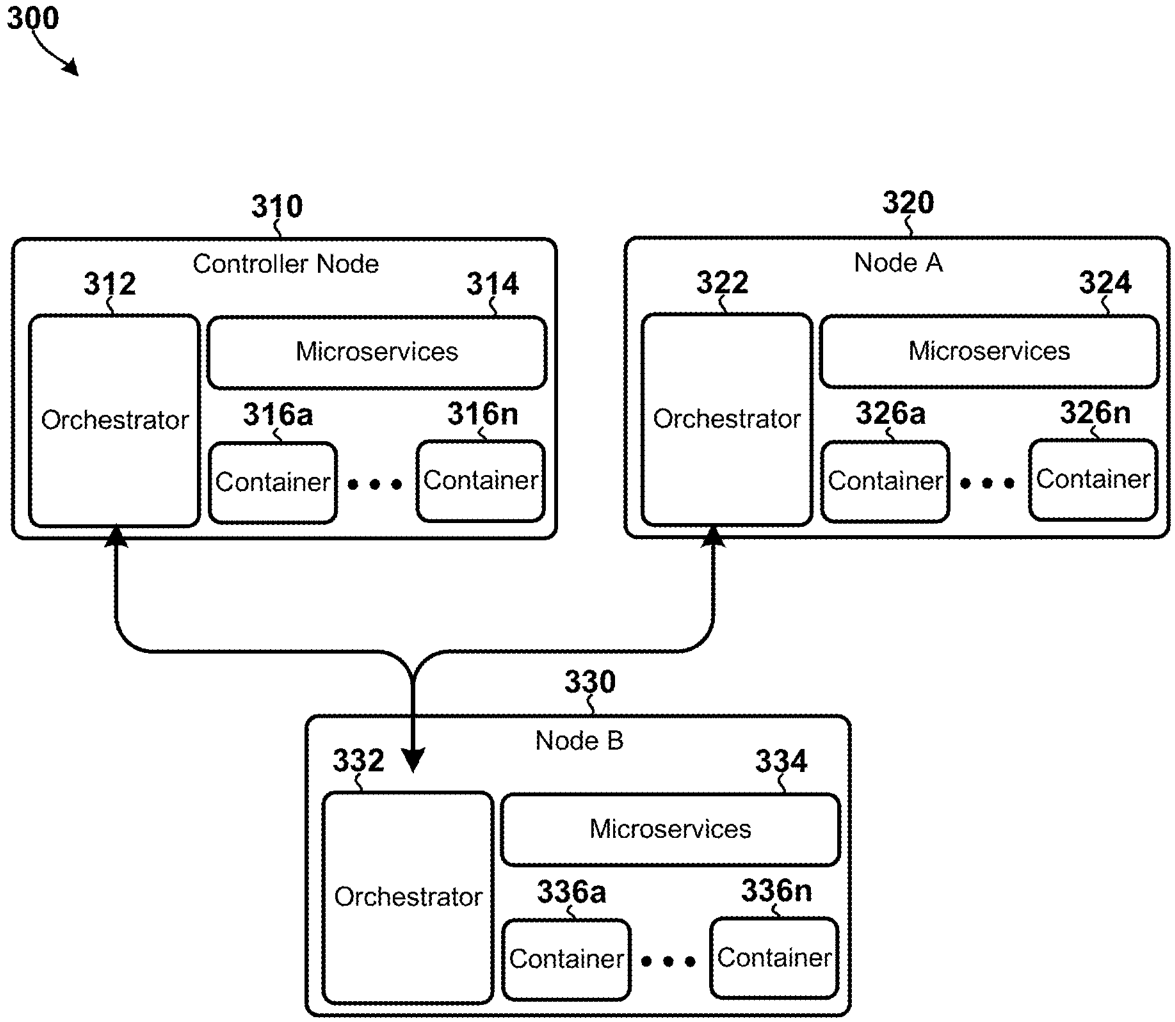
FIG. 3 is a component block diagram illustrating a distributed container network suitable for use with some embodiments.

FIG. 3 is a high-level depiction of a distributed container network 300 (e.g., Vmesh 104 illustrated in FIG. 1A) in accordance with some embodiments. In the example illustrated in FIG. 3, the distributed container network 300 includes a controller node 310 (master node), node A 320, and node B 330. In some embodiments, each of the nodes 310, 320, 330 may be an ECG 110.

Each of the nodes 310, 320, 330 may include an orchestrator 312, 322, 332, microservices 314, 324, 334 and containers 316*a-n*, 326*a-n*, 336*a-n*. The orchestrator 312 in the controller node 302 may be responsible for any or all of the containers 316*a-n*, 326*a-n*, 336*a-n* that run in the network. The orchestrator 312 may determine which node (e.g., node A 320, node B 330, etc.) has the available and appropriate resources for running a container 316*a-n*, 326*a-n*, 336*a-n*. The other nodes may also have orchestrator capability and/or may have a mirror orchestrator being run either in one of the other nodes or all of the other nodes. In the event that there is a problem with the primary orchestrator, a secondary orchestrator may take over.

The distributed container network 300 and/or any or all of the nodes 310, 320, 330 may have access to the storage capability of one or more ECGs 110. Some applications or operations may include or use data persistence, which may prevent problems when restarting or being transferred to another node. The example illustrated in FIG. 3 also allows for microservices 314, 324, 334 to be offered. The location of the microservice 314, 324, 334 may be driven by the available resources available and needed by the application. If another node is added or removed from the network, a new container 316*a-n*, 326*a-n*, 336*a-n* may be spun up on the appropriate node for running the application.

Figure 4:
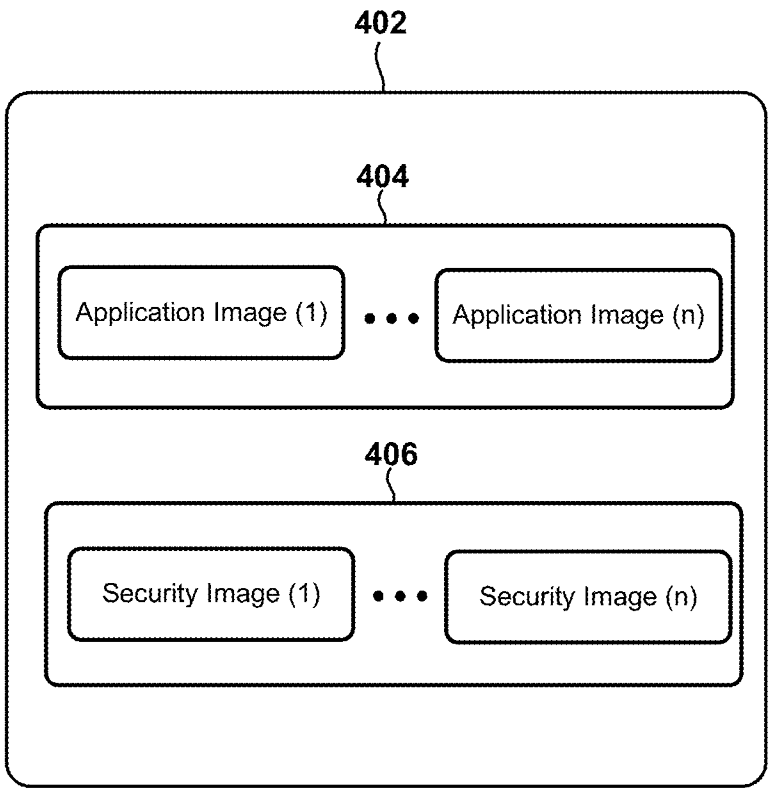
FIG. 4 is a component block diagram illustrating a secure container in accordance with some embodiments.

FIG. 4 illustrates example components that could be included within a secure container 402 in accordance with some embodiments. In particular, FIG. 4 illustrates that a secure container 402 may include one or more application images 404 and one or more security images 406. The inclusion of the security image(s) 406 with the application image(s) 404 may allow for a more robust and secure container environment and/or for a more streamlined implementation of containers with appropriate security requirements.

FIGS. 5A-7D illustrate networks that implement modular ECG architectures that allow for horizontal and/or vertical scalability. The modular approach allows the ECG to scale dynamically based on the existing resource pool or by adding more hubs/ECGs or by levering cloud architectures in which the ECG is an active extension of a cloud service performing local functions.

In some embodiments, the ECG may be configured to scale horizontally whether it is initially installed as a standalone or as a small network. As a standalone implementation, the ECG may connect to other ECGs in a wireless mesh network, using a wired LAN connection or a combination of wireless and wired LAN.

The addition of add-on modules to the ECG in accordance with the embodiments may enable the ECG to expand its capabilities within the local node by sharing computing capability and or sharing module capabilities with other ECG nodes in the local network. The add on module may be hardware and/or software modules. The hardware modules may be an add on physical device to the ECG that provides additional computing connectivity and/or capability. Additional computing capability may include the use of a camera or a IoT sensor that is connected to the ECG either by physical or wireless methods. The control of the physical module may be achieved through a secure container running on the local ECG that the module is communicating directly with. The module may also be a secure container whose image is obtained from the ECG that has WAN connectivity or from the internet or service provider network.

Figure 5A:
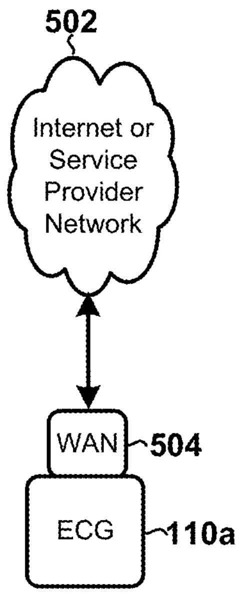
FIGS. 5A-5C are block diagrams illustrating components in a system that is configured to add a new ECGs to a local network in accordance with some embodiments.
Figure 5B:
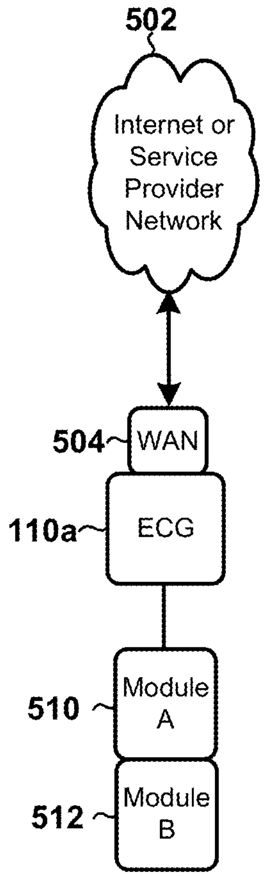
Figure 5C:
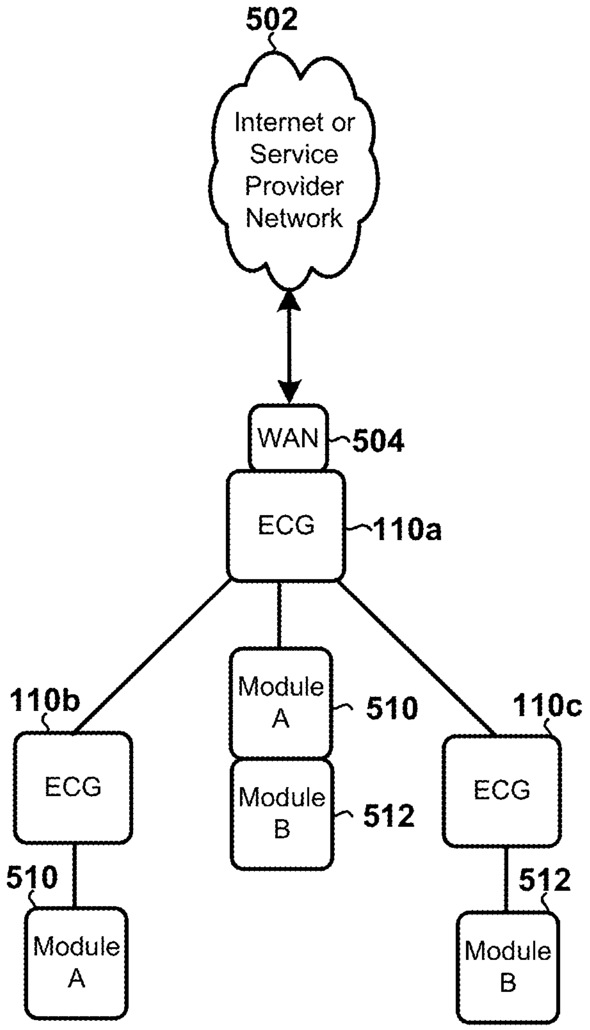

In the example illustrated FIGS. 5A-5C, the network includes one or more ECGs 110*a-c*, an Internet or Service Provider Network 502, a WAN module 504, additional module A 510, and additional module B 512. In particular, FIGS. 5A-5C illustrate that one or more new ECGs (e.g., ECGs 110*b*, 110*c*, etc.) may be added to the local network, ad-hoc. Each application of function (e.g., functions provided by additional module A 510 and/or additional module B 512) may run locally on each node (e.g., ECGs 110*b*, 110*c*, etc.) without coordination. That is, in FIG. 5C, the ECGs 110*a-c* within the local network do not coordinate resources.

The additional ECGs 110 (e.g., ECGs 110*b*, 110*c*, etc.) added to the local network in FIG. 5C may utilize the main ECG 110*a* that has a WAN connection used for providing connectivity to the internet or service provider network that may or may not be part of the local network functionality. The ECGs 110*b*, 110*c* connected to the ECG 110*a* with WAN connectivity may utilize the modules (e.g., module A 510, module B 512, etc.) to perform unique functions. The modules shown in FIG. 5C associated with the new ECGs 110*b*, 110*c* that have been added to the main ECG 110*a* may run different modules, secure containers, that are applicable to the desired functions needed for the local ECG. For improved computing and functionality across the local network, in some embodiments, the ECGs 110 may be configured so that the modules shown in FIGS. 5A-5C do not share resources. The modules shown in FIGS. 5A-5C may be autonomous to other modules run in the same local network that are being run in different ECGs 110 in the local network.

Figure 6A:
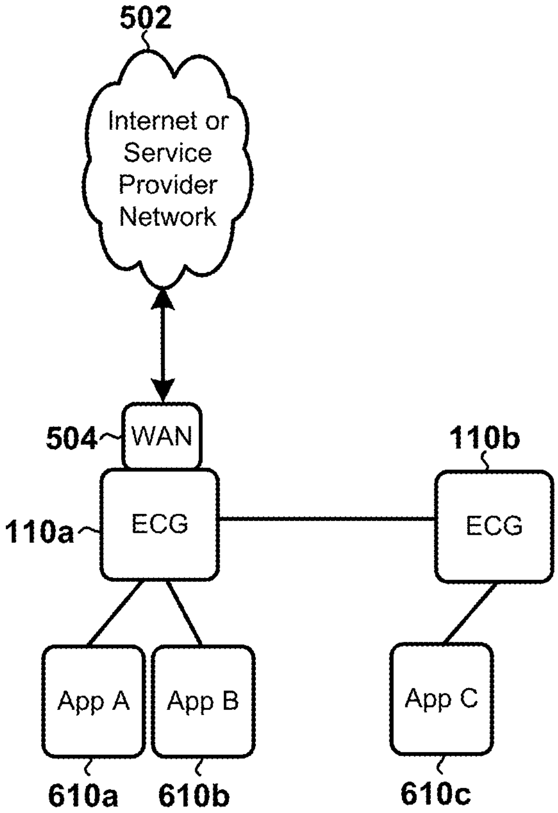
FIGS. 6A and 6B are block diagrams illustrating components in a system that is configured to implement or use a compute distribution process with containers to horizontally expand the overall network in accordance with some embodiments.
Figure 6B:
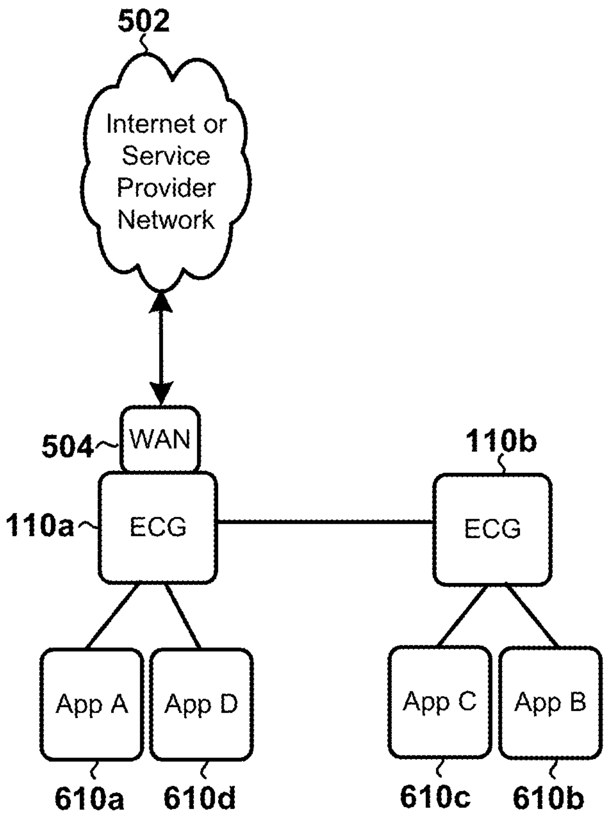

In the example illustrated FIGS. 6A and 6B, the network includes one or more ECGs 110*a-b*, an Internet or Service Provider Network 502, a WAN module 504, and various applications (App A-D) 610*a-d*. FIGS. 6A and 6B also illustrate using a compute distribution process, with containers using an orchestrator for the ECG 110 local network, may be able to obtain and let the local network take advantage of the new resources made available to the local network thereby increasing the overall network horizontally. The orchestrator used may be kubernetes (k8), docker swarm, k3s, K8 in the cloud (502) with K3S with each ECG acting as a node within the local network.

In FIGS. 6A and 6B, the ECGs 110*a-b* within the local network share resources for running applications and other functions so the local application on a particular ECG 110*a-b* can operate at optimum conditions. FIG. 6B illustrates that App B 610*b* may be moved from one ECG 110*a* to another ECG 110*b* to facilitate the use of App D 610*d* being run. App B 610*b* functions may still be controlled by the home ECG 110*a*, however the computing and other resources are utilized on the other ECG 110*b*.

Through using a dynamic resource allocation scheme for the local network the application running on the local network, secure container, may be moved to different ECGs 110*a-b* within the local network depending on the orchestration policies. For example, the dynamic resource allocation scheme enables App A 610*a* running on ECG 110*a* with WAN 504 capabilities to move to ECG 110*b* as resource requirements are needed to run application on ECG 110*a*. When the resources are freed up on ECG 110*a*, the application may be moved back to ECG 110*a* from ECG 110*b* or remain on ECG 110*b*. As another example the dynamical allocation scheme can involve having App B 610*b* running on ECG 110*b* be moved to ECG 110*a* based on the resource requirements needed by ECG 110*b*. When the resource requirements are freed up on ECG 110*b* the application may be moved back to ECG 110*b* from ECG 110*b* or remain on ECG 110*a*. Other scenarios involving additional ECGs 110 in the local network enable the applications to be moved to the best node or ECG 110 that have the resources to best run the application or used to offload a ECG 110.

The dynamic allocation (elastic compute) or reallocation applications between ECGs 110 may allow for distributed computing capabilities within the local network. The ECG 110 local network may utilize several WANs for upstream connectivity. The WANs used may also be obtained from several ECGs 110 within the local network. The use of multiple WAN connections may enable the aggregation of bandwidth or provide alternative paths for the Apps to communicate from the cloud to the respective ECG or from the ECG to the cloud.

FIGS. 7A-7D show how the ECGs 110*a-b* may also scale vertically based on the applications 702 run in the container. The ECG 110*a* either as a standalone or collective can act as an extension of an upstream cloud service for local content processing. The orchestrator (not illustrated separately in FIGS. 7A-7D) may be kubernetes (k8), docker swarm, k3s, K8 in the cloud (502) with K3S with each ECG acting as a node within the local network. The local processing allows for improved performance of the service being delivered as well as providing. The dynamic allocation, elastic allocation, allows for each ECG 110*a-b* to run the application(s) 702 that best match the resources required to the resources available either with the ECG 110*a* or ECG cluster (ECG 110*a* and 110*b*) based on the orchestrator policies and App capabilities.

Utilizing an elastic compute process with the ECG 110*a* enables the ECG 110*a* to redistribute resource consumption with other ECGs 110*b*. The vertical allocation or reallocation using an elastic compute process with the ECG 110 as part of the local network may dynamically allocate applications in secure containers run on the ECG 110. For example, in FIG. 7B, an ECG 110*a* runs App A being run on ECG (1) and App B being run on ECG (1) and 502 where the ECG can utilize compute capabilities on 502 in addition to its compute capabilities locally. ECG (1) can either have App B run entirely locally on ECG (1) and mirrored on 502. The mirroring on the App allows for the continuation of computing in the event of a disruption in the WAN 504 connectivity.

Figure 7A:
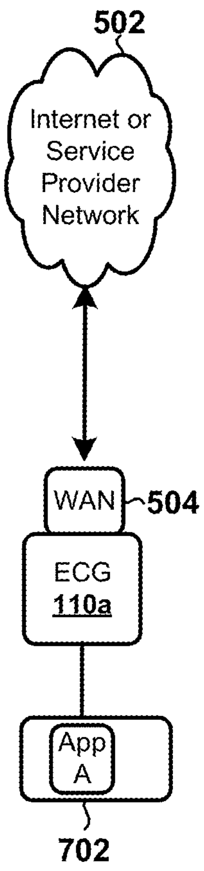
FIGS. 7A-7D are a block diagrams illustrating components in a system that is configured to implement or use applications in containers to vertically expand the overall network in accordance with some embodiments.
Figure 7B:
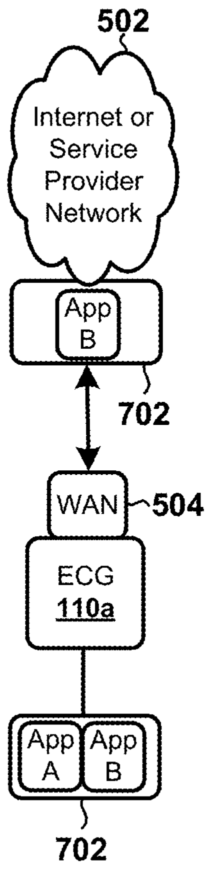
Figure 7C:
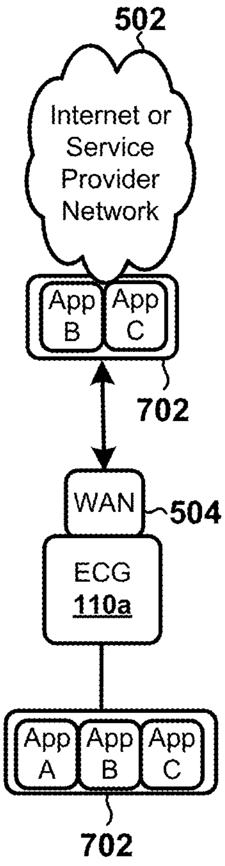
Figure 7D:
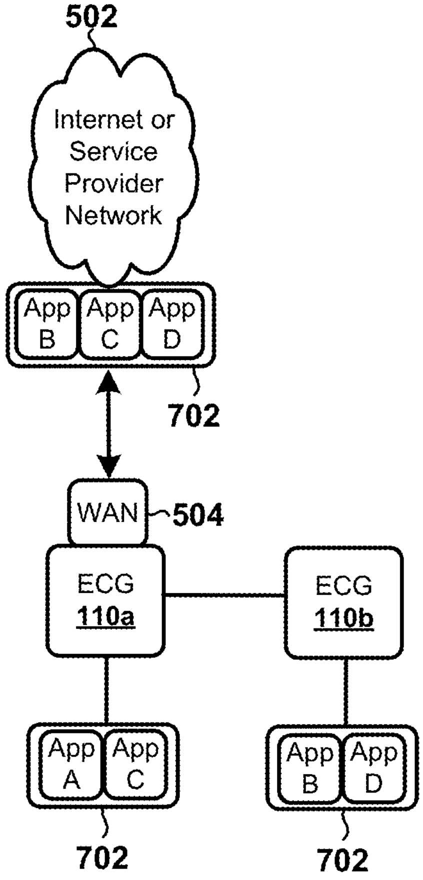

FIG. 7D illustrates the vertical elastic compute capability of being able to move the running App from and ECG to the cloud or from the cloud to an ECG as resources become more available. The dynamic allocation (elastic compute) or reallocation applications between ECGs and between ECGs and the cloud (external) allows for distributed computing capabilities within the local network that can use both vertical and horizontal elastic computing. The orchestrator used may be kubernetes (k8), docker swarm, k3s, K8 in the cloud (502) with K3S with each ECG acting as a node within the local network.

Systems and components (e.g., ECGs 110, Vmesh 104, etc.) configured in accordance with the various embodiments are secure and/or provide a secure framework for running software applications at the edge of the network. They control what the software applications can see on the ECGs (e.g., what hardware/services they see), control access and use of the services and hardware, and/or prevent the unauthorized access or use of any of the services or hardware. They also allow applications from different 3rd parties to interfere to operate within the system without interfering with one another.

Some embodiments may run software applications in a sandbox called a container, which constrains subset of the system resources the software applications can access. The container may be modified into a secure container suitable for licensing or using licenses to allow, restrict, or control access or use of all or portions of the available hardware and services. Using the secure container, software applications can only access a specific piece of hardware or service if they have a license to access it.

Some embodiments may include components configured to cryptographically (or pictographically) sign licenses. Software applications may be required to object and decrypt a suitable license before accessing the services or hardware. For example, a client software application that wants to make use of a blue tooth device has to first obtain a license to access Bluetooth. After obtaining the license, the client software application may access the Bluetooth resources identified in or permitted by the obtained license.

Some embodiments may include an ECG 110 configured to run a service along with the modified container platform (secure container platform 222). Before launching a software application, they check the license, and then the environment that the application is going to run in, such that it only has visibility into the devices it is properly licensed for.

FIGS. 8A through 9C illustrate components, operations, and communications in a system configured to perform methods 800, 900 of creating and using licenses and secure containers to run software applications at the edge of the network in accordance with some embodiments. Method 800 includes start 802, configure 804, prepare 806, run 808, active 810, stop 812 and remove 814 phases or groups of operations. Similarly, method 900 includes start 902, configure 904, prepare 906, and run 908 phases or groups of operations.

Figure 8A:
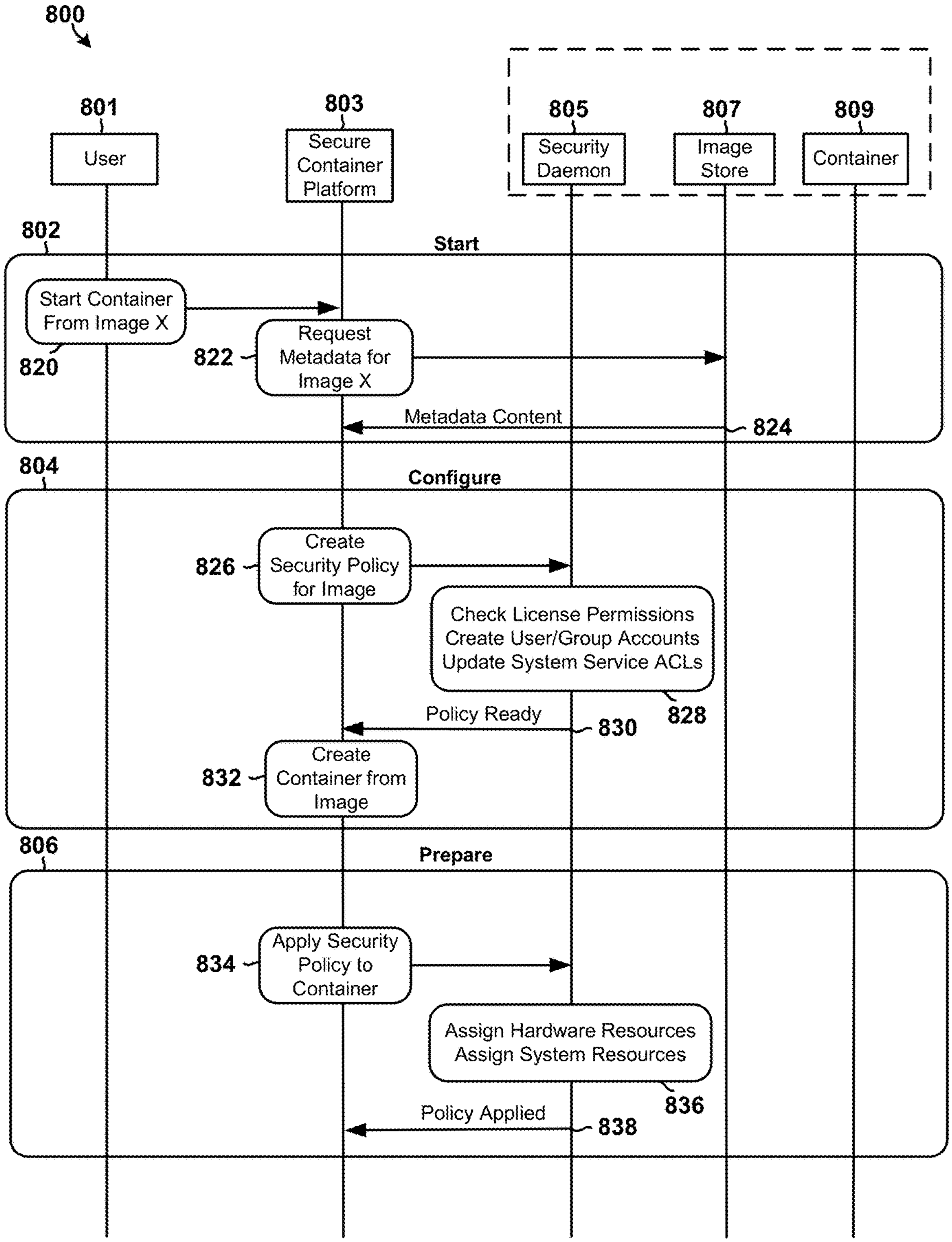
FIGS. 8A through 8C are process flow diagrams illustrating methods of creating, configuring, preparing, running, stopping and removing secure containers in accordance with some embodiments.
Figure 8B:
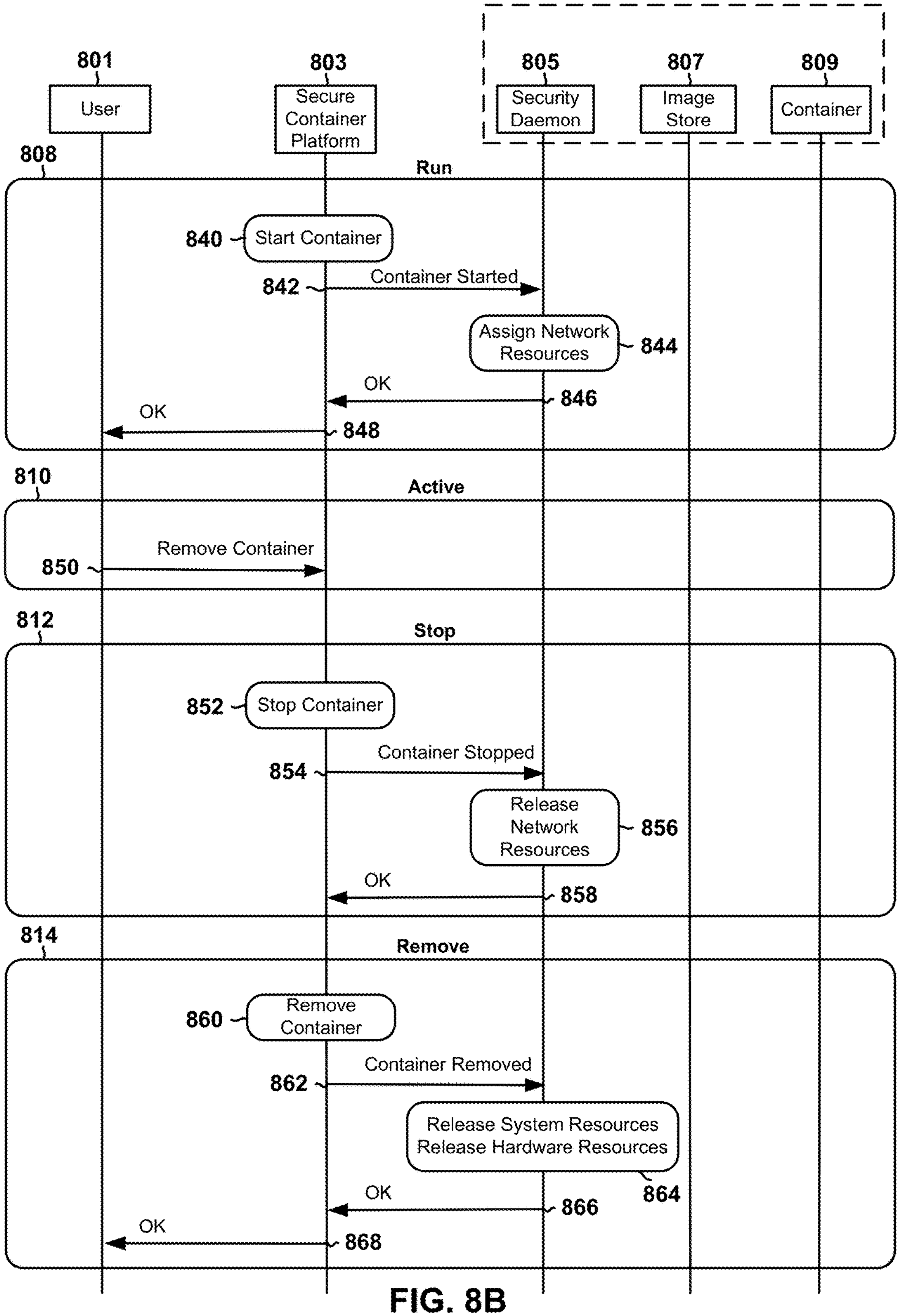
Figure 8C:
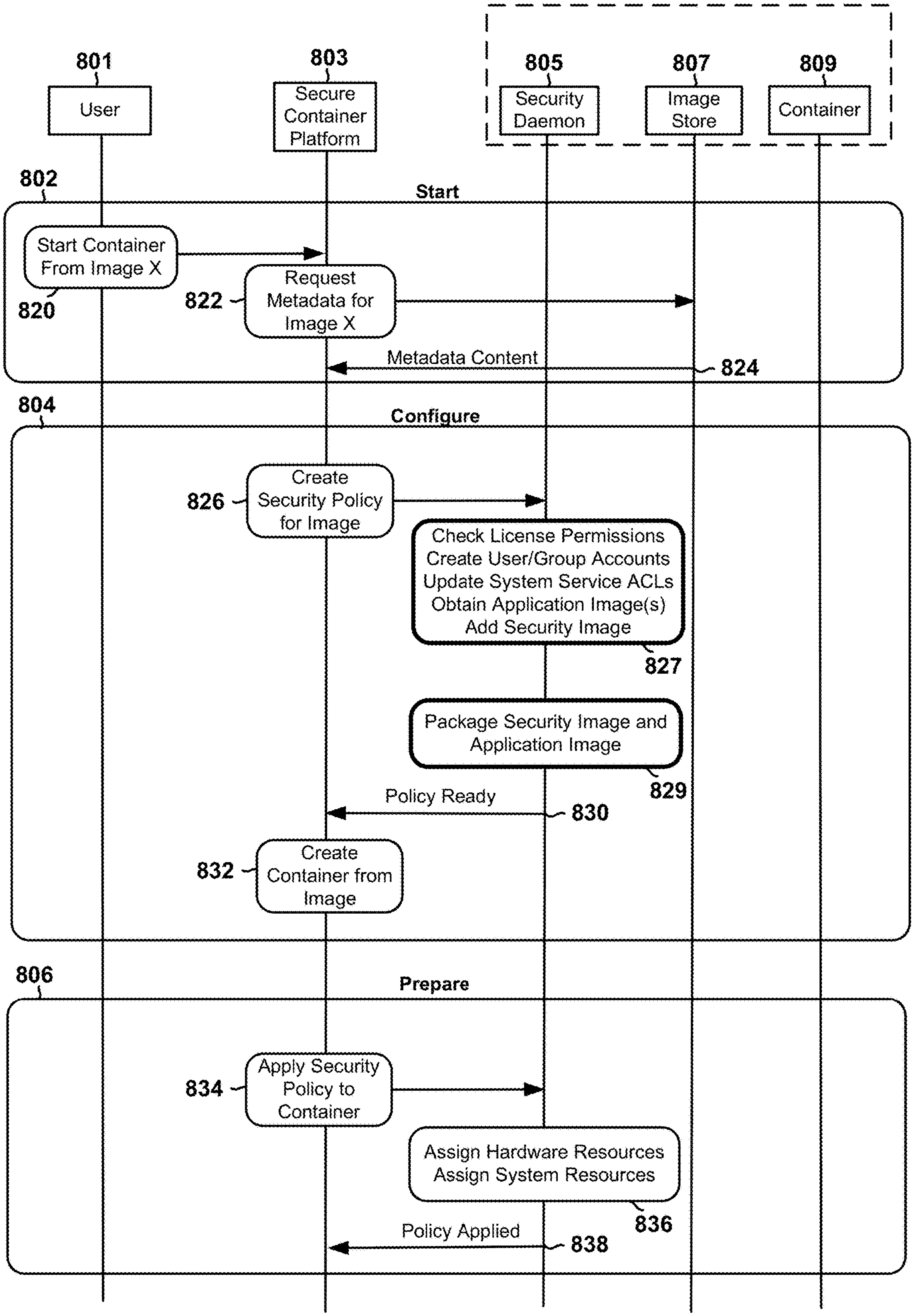

In the example illustrated in FIGS. 8A-8C, the system includes a user device 801, a secure container platform 803, a security daemon 805, an image store 807, and a container 809. In the example illustrated in FIGS. 9A-C, the system further includes a container manager 901, hardware manager 903, backup and restore manager 905, and keystore manager 907.

As is discussed in more detail below, the security daemon 805 may be configured to work in conjunction with the secure container platform 803 to set up the environment in which the container 809 (or application) runs in. The security daemon 805 may map in any devices that need to be accessed (and are properly licensed), and provide user or group access permissions to the container 809 or application (e.g., if it needs to access services that are provided managed by LINUX group mechanism, etc.). In some embodiments, the security daemon 805 may be configured to set up the environment in the start 802, configure 804, and/or prepare 806 phases.

Conventional solutions may require that the operations of the configure 804, 904 and prepare 806, 906 phases be performed by a system administrator (sysadmin). That is, systems that utilize containers and many virtualization systems typically require a sysadmin to decide whether certain operations should be performed, whether permission should be granted, whether a software application should have access to certain hardware, keys, disk areas, etc. While such conventional solutions could be effective for a small number of devices, they do not scale well and cannot be used in systems that include a multitude (e.g., thousands, hundreds of thousands, etc.) of devices. The embodiments described herein (e.g., methods 800, 900, etc.) overcome these and other limitations of conventional solutions, and allow the above-described sysadmin actions to be captured at the point that container is designed by the developer, and for the decision process to be embedded into the container through licenses. Licenses may be issued by a device manufacturer to third party developers, which may then put the licenses into their containers. This allows hardware and information and sharing of data to be done at scale, with little or no human or sysadmin interaction.

With reference to FIG. 8A, in operation block 820, the user device 801 may communicate with the secure container platform 803 to inform or request the start of a container from an image (Image X). In operation block 822, the secure container platform 803 may request metadata for the image from the image store 807. In operation 824, the image store 807 may send the metadata content to the secure container platform 803.

In operation block 826, the secure container platform 803 may create a security policy for the image. In operation block 828, the security daemon 805 may check license permissions, create user/group accounts, and update system service access-control lists (ACLs). In operation 830, the security daemon 805 may send a policy ready message to the secure container platform 803. In operation block 832, the secure container platform 803 may create a container from the image.

In operation block 834, the secure container platform 803 may apply the security policy to the container. In operation block 836, the security daemon 805 may assign hardware resources and system resources for the container. In operation 838, the security daemon 805 may send a policy applied message to the secure container platform 803.

With reference to FIG. 8B, in operation block 840, the secure container platform 803 may start the container. In operation 842, the secure container platform 803 may send a container started message to the security daemon 805. In operation block 844, the security daemon 805 may assign network resources to the container. In operation 846, the security daemon 805 may send an OK message to the secure container platform 803. In operation 848, the secure container platform 803 may send an OK message to the user device 801.

After the operation 848, the container may be active and/or operating in an active state. In operation 850, the user device 801 may send a remove container message to the secure container platform 803.

In operation block 852, the secure container platform 803 may stop the container (i.e., in response to receiving the remove container message). In operation 854, the secure container platform 803 may send a container stopped message to the security daemon 805. In operation block 856, the security daemon 805 may release the previously allocated or assigned network resources. In operation 858, the security daemon 805 may send an OK message to the secure container platform 803.

In operation block 860, the secure container platform 803 may remove the container. In operation 862, the secure container platform 803 may send a container removed message to the security daemon 805. In operation block 864, the security daemon 805 may release the assigned system and hardware resources. In operation 866, the security daemon 805 may send an OK message to the secure container platform 803. In operation 868, the secure container platform 803 may send an OK message to the user device 801.

With reference to FIG. 8C, in operations 820-826 and 830-838, the components 801-809 may perform the same or similar operations discussed above with reference to FIG. 8A. However, in operation block 827, the security daemon 805 may check license permissions, create user/group accounts, update system service ACLs, obtain application images, and add a security image (e.g., in response to receiving the security policy for the image from the secure container platform 803 in operation 826). In operation block 829, the security daemon 805 may package the security image(s) and application image(s) into a single secure container (e.g., secure container 402 illustrated in FIG. 4, etc.). The particular security image utilized may involve one or more security images depending on the application requirements and license permissions and other policy decisions. The security image or images used for container that is created may be unique for each associated container or pods.

With reference to FIG. 9A, in operation block 910, the user device 801 may communicate with the container manager 901 to inform or request the start of a container from an image (Image X). In operation block 912, the container manager 901 may request metadata for the image from the image store 807. In operation 914, the image store 807 may send the metadata content to the secure container platform 803.

In operation block 916, the container manager 901 may configure to host for the image. In operation block 918, the security daemon 805 may check metadata integrity, extract licenses from metadata, check image permissions, create user/group accounts, and update system service ACLs. That is, operation block 918 may include receiving, by a security daemon operating on a processor of the edge device, a configure host request message from a container manager, and the security daemon determining integrity of metadata, extracting licenses from the metadata, determining image permissions, creating a user or group account, and updating one or more system service access-control lists (ACLs) in response to receiving the configure host request message from the container manager. In operation 920, the security daemon 805 may send an OK message to the container manager 901. In some embodiments, the security daemon 805 may send an OK message to the container manager 901 by generating and sending a configure host response message to the container manager 901.

Figure 9B:
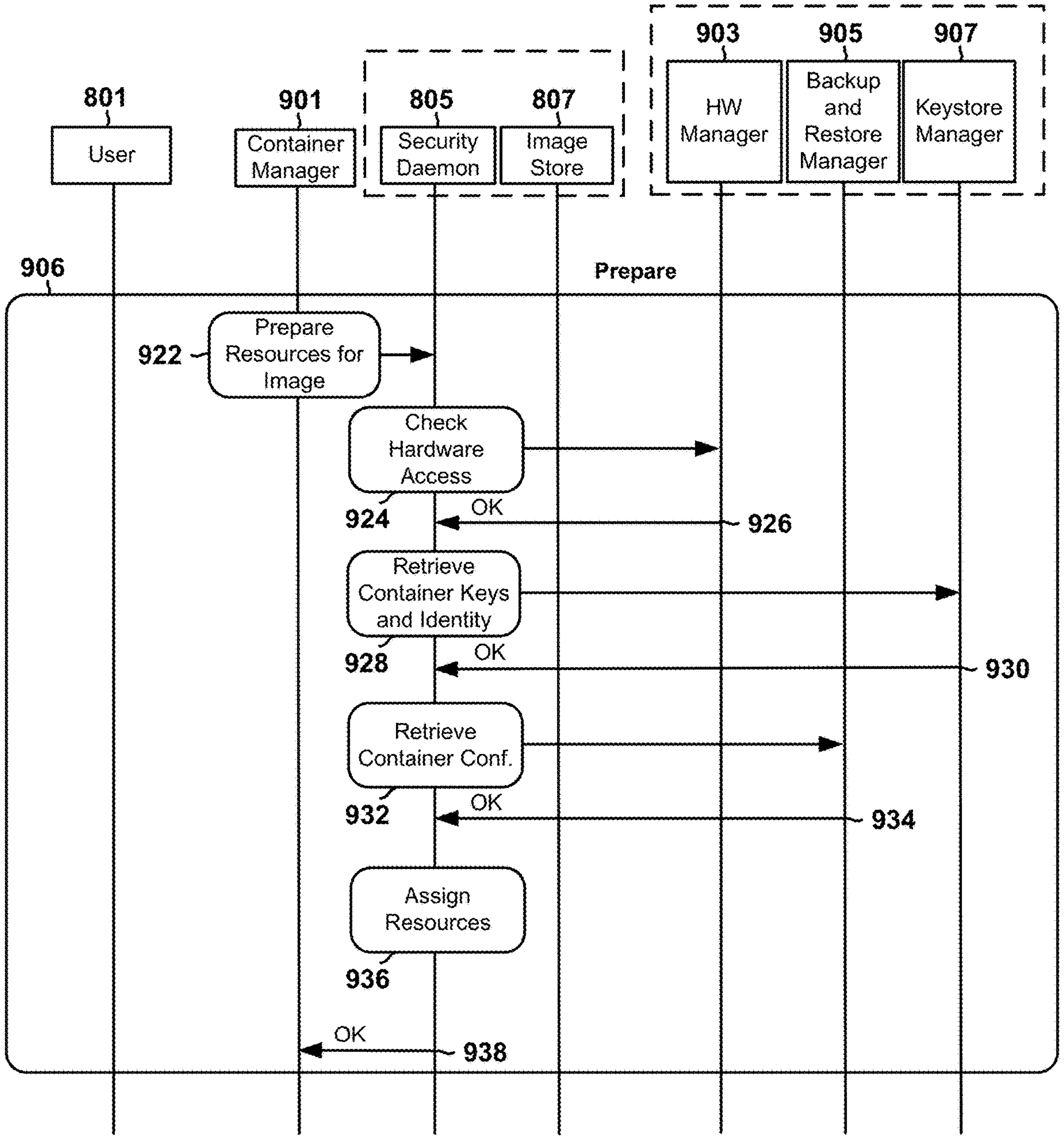

FIG. 9B illustrates that the prepare 906 phase includes operation blocks 922-938. In the prepare 906 phase, the system prepares to start the container. In overview, this includes the security daemon 805 communicating with three of the managers in the system (e.g., the hardware manager 903, the backup and restore manager 905, and the keystore manager 907) to pull resources or other information that may be needed to run the container correctly. For example, if the container is supposed to be able to talk to a particular hardware device, then that information and the hardware device information is exposed to the container. In addition, the security daemon 805 may retrieve any identifying information that the container has preserved from a previous operation or a backup or any previously backed up container configurations. The security daemon 805 may also assign memory, disk and other resources for use by the container.

More specifically, in operation block 922, the container manager 901 may prepare resources for the image. In operation block 924, the security daemon 805 may receive a resource preparation request message from a container manager. In addition, in operation block 924, the security daemon 805 may check hardware access with the hardware manager 903. That is, the security daemon 805 may communicate with a hardware manager to determine hardware access in response to receiving the resource preparation notification message from the container manage. In operation 926, the hardware manager 903 may send an OK message to the security daemon 805.

In operation block 928, the security daemon 805 may retrieve container keys and identity from the keystore manager 907. Said another way, operation block 928 may include obtaining, by the security daemon 805, container keys and identity from a keystore manager in response to determining suitable hardware is accessible. In operation 930, the keystore manager 907 may send an OK message to the security daemon 805.

In operation block 932, the security daemon 805 may retrieve the container configuration from the backup and restore manager 905. That is, operation block 932 may include using, by the security daemon 932, the obtained the container keys and identity to determine a container configuration from a backup and restore manager 905. In operation 934, the backup and restore manager 905 may send an OK message to the security daemon 805.

In operation block 936, the security daemon 805 may assign resources to the container. Said another way, operation block 936 may include assigning, by the security daemon 805, resources to the container based on the determined container configuration. In operation 938, the security daemon 805 may send an OK message to the container manager. In some embodiments, sending the OK message may include the security daemon 805 generating and sending a resource preparation response message to the container manager for use in starting a container.

Figure 9C:
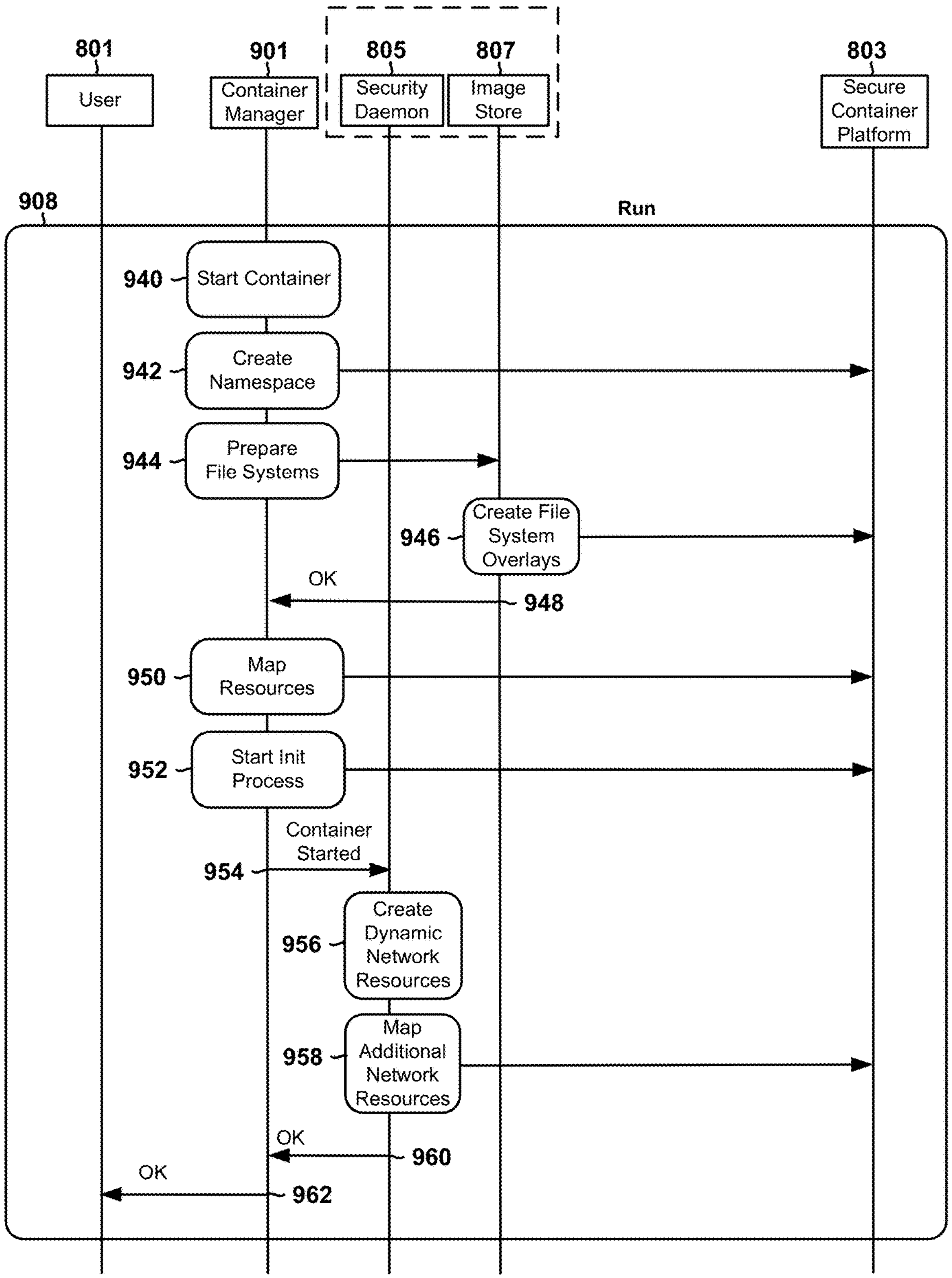

With reference to FIG. 9C, in operation block 940, the container manager 901 may start the container. In operation block 942, the container manager 901 may communicate with the secure container platform 803 to create a namespace for the container. The namespace may be the security enclave in which the container will operate. In operation block 944, the container manager 901 may communicate with the image store 807 to prepare the file systems. In operation block 946, the image store 807 may communicate with the secure container platform 803 to create file system overlays, which is what the container will run in. In operation 948, the image store 807 may send an OK message to the container manager 901. In operation block 950, the container manager 901 may communicate with the secure container platform 803 to map resources.

Thus, operation blocks 942-950 may include creating, by the container manager 901, a namespace for the container by communicating with a secure container platform and preparing, by the container manager, a file system for the container and file system overlays in which the container runs, by communicating with an image store.

In operation block 952, the container manager 901 may communicate with the secure container platform 803 to start the initialization process for starting the container. Once the container has started, the system may dynamically deliver more content and more capabilities to the container. For example, the system may automatically and dynamically deliver networking capabilities to the container without any human or sysadmin interaction.

In operation 954, the container manager 901 may send a container started message to the security daemon 805. In operation block 956, the security daemon 805 may create dynamic network resources. In operation block 958, the security daemon 805 may communicate with the secure container platform 803 to map additional network resources. In operation block 960, the security daemon 805 may send an OK message to the container manager 901. In operation 962, the container manager 901 may send an OK message to the user device 801.

Figure 10:
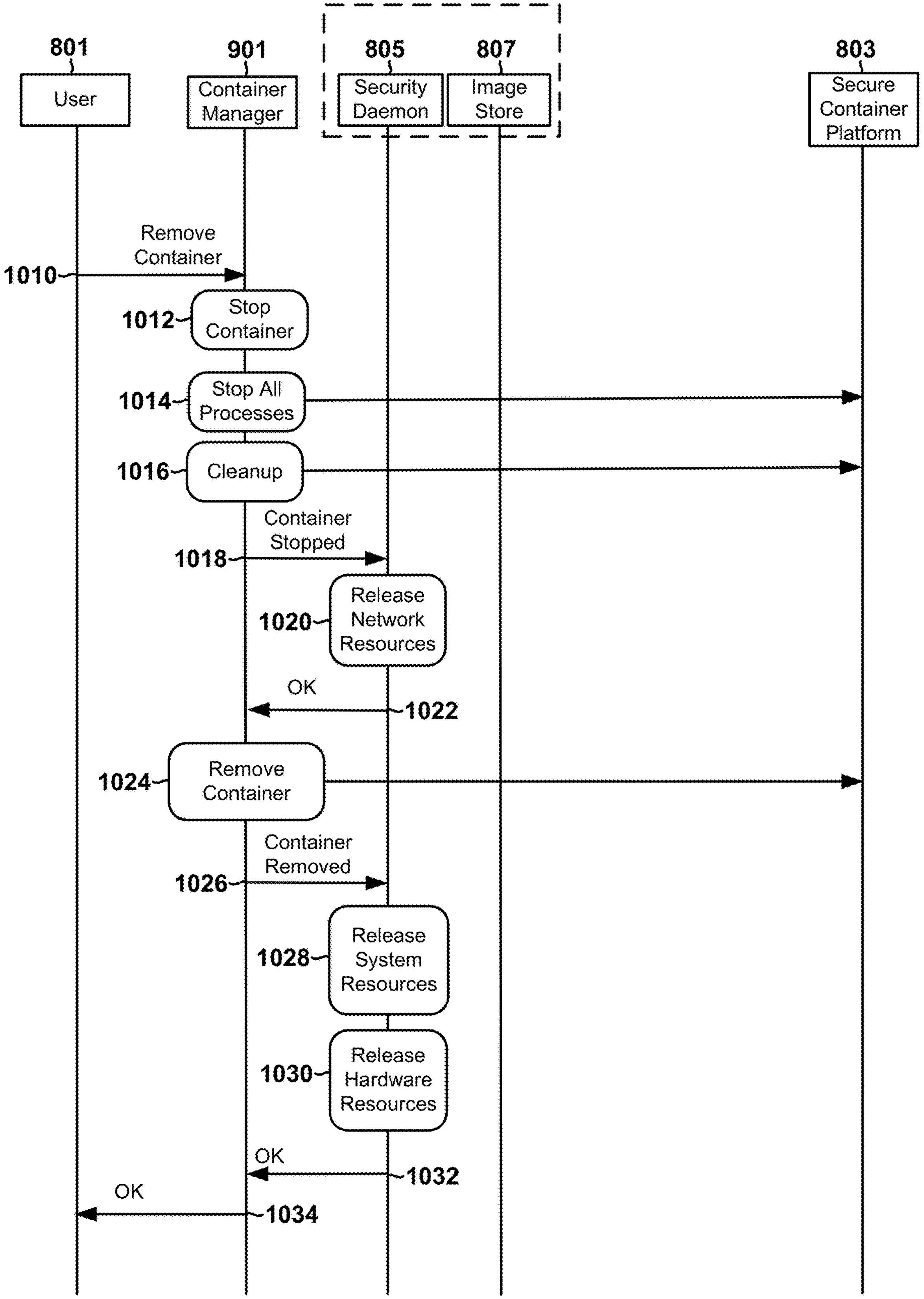
FIG. 10 is a process flow diagram illustrating a method of removing a secure container in accordance with some embodiments.

FIG. 10 illustrates components, operations, and communications in a system configured to perform a method 1000 of removing a container in accordance with some embodiments. In the example illustrated in FIG. 10, the system includes a user device 801, a secure container platform 803, a security daemon 805, an image store 807, and a container manager 901.

In operation 1010, the user device 801 may send a remove container message to the container manager 901. In operation block 1012, the container manager 901 may stop the container. In operation block 1014, the container manager 901 may communicate with the secure container platform 803 to stop all processes. In operation block 1016, the container manager 901 may communicate with the secure container platform 803 to perform cleanup operations. In operation block 1018, the container manager 901 may send a container stopped message to the security daemon 805. In operation block 1020, the security daemon 805 may release network resources. In operation 1022, the security daemon 805 may send an OK message to the container manager 901. In operation block 1024, the container manager 901 may remove the container. In operation 1026, the container manager 901 may send a container removed message to the security daemon 805. In operation block 1028, the security daemon 805 may release system resources.

In operation block 1030, the security daemon 805 may release hardware resources. In operation 1032, the security daemon 805 may send an OK message to the container manager 901. In operation 1034, the container manager 901 may send an OK message to the user device 801.

Figure 11A:
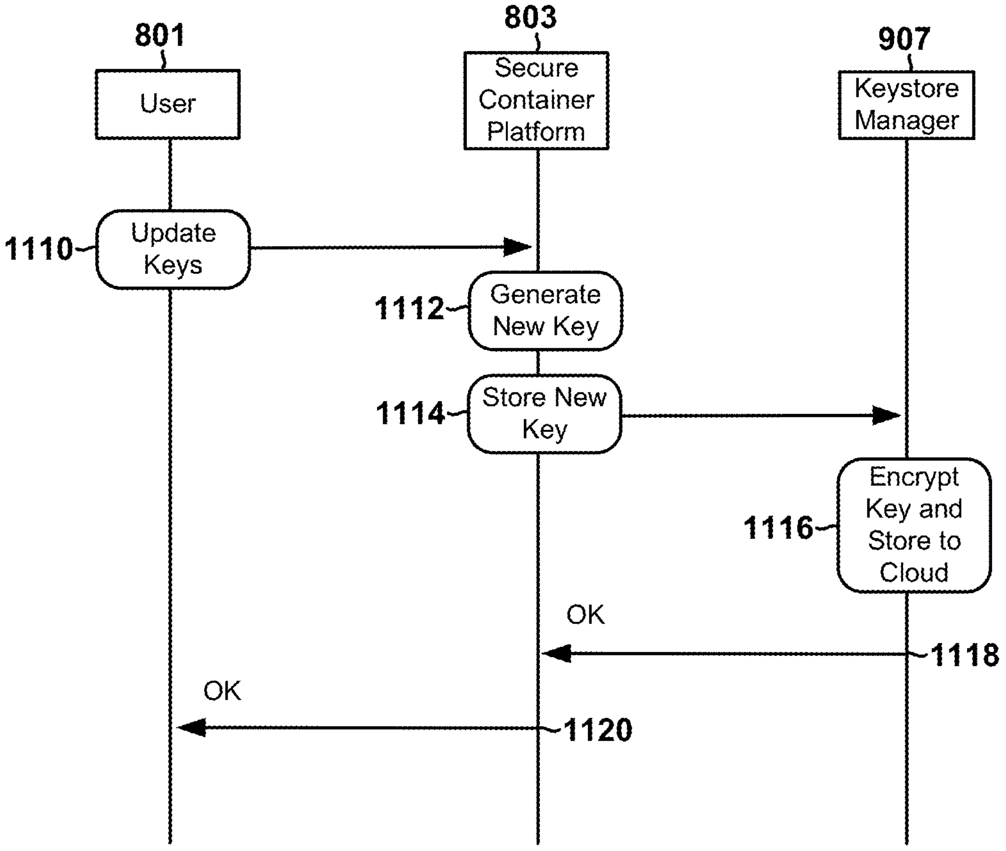
FIGS. 11A through 11C are process flow diagrams illustrating method of operating a secure container in accordance with some embodiments.
Figure 11B:
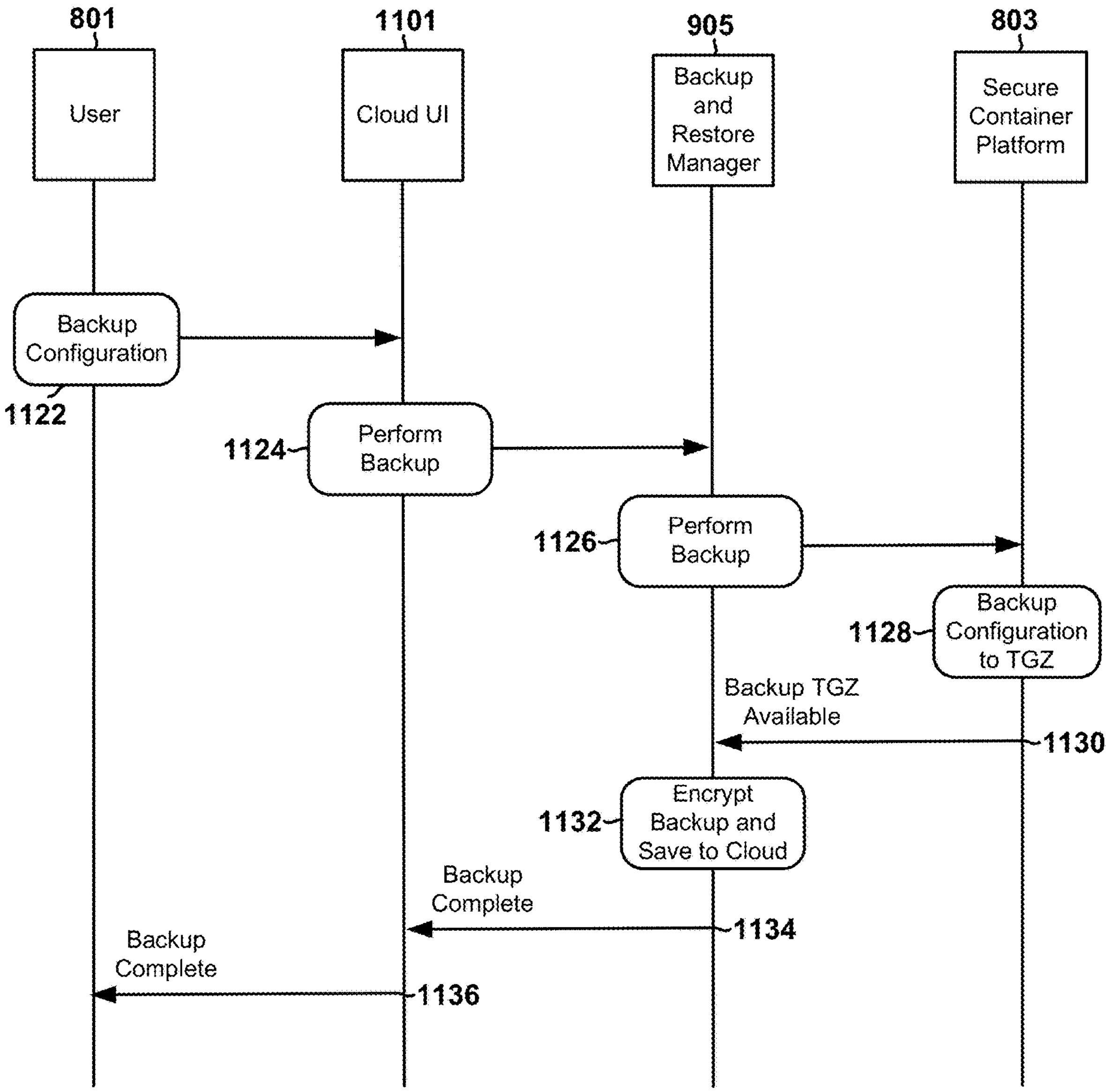
Figure 11C:
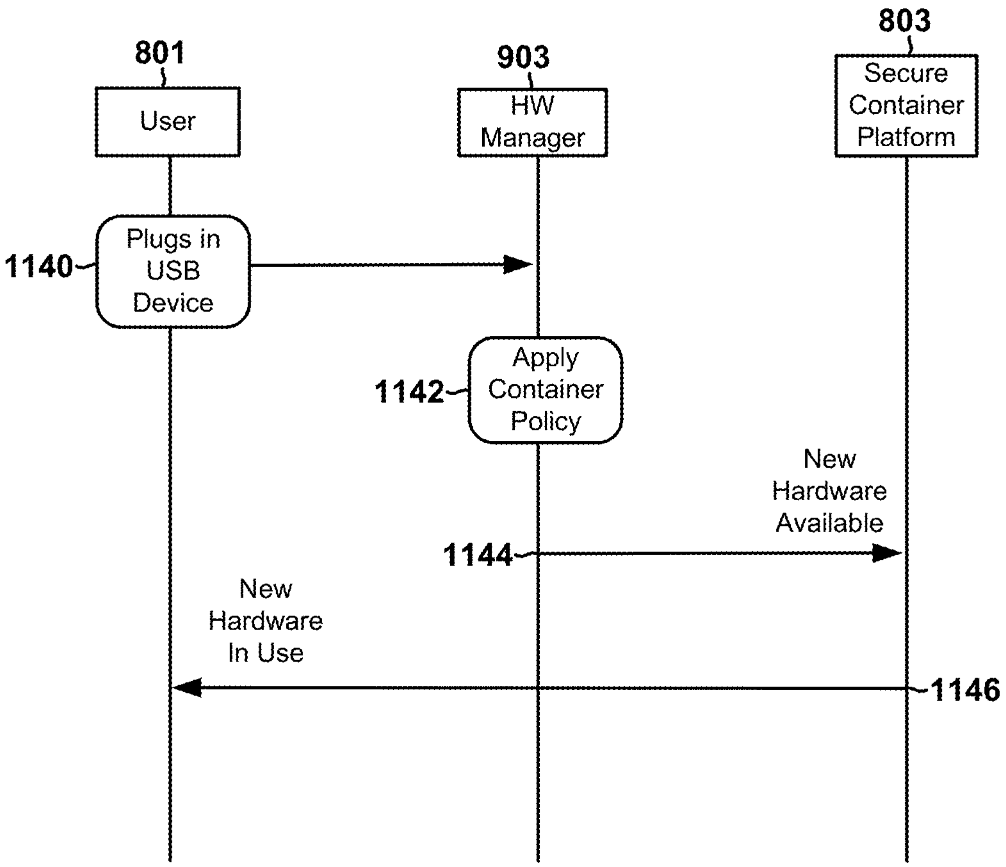

FIGS. 11A-C illustrate components, operations, and communications in a system configured to perform a method 1100 of operating a container in accordance with some embodiments. In the example illustrated in FIGS. 11A-C, the system includes a user device 801, a secure container platform 803, a hardware manager 903, a backup and restore manager 905, a keystore manager 907, and cloud user interface (UI) 1101 component.

With reference to FIG. 11A, in operation block 1110, the user device 801 may communicate with the secure container platform 803 to update the encryption/decryption keys.

In operation block 1112, the secure container platform 803 may generate a new key. In operation block 1114, the secure container platform 803 may communicate with the keystore manager 907 to store the new key in memory. In operation block 1116, the keystore manager 907 may encrypt the key and store it in a cloud network. In operation 1118, the keystore manager 907 may send an OK message to the secure container platform 803. In operation 1120, the secure container platform 803 may send an OK message to the user device 801.

With reference to FIG. 11B, in operation block 1122, the user device 801 may communicate with the cloud UI 1101 component to save or back up the container configuration information. In operation block 1124, the cloud UI 1101 component may communicate with the backup and restore manager 905 to store the container information and perform other backup operations. In operation block 1126, the backup and restore manager 905 may communicate with the secure container platform 803 to store the container configuration information and perform other backup operations. In operation block 1128, the secure container platform 803 may backup the configuration to TGZ, tar gzip. In block 1130, the secure container platform 803 may send a backup TGZ available message to the backup and restore manager 905.

In operation block 1132, the backup and restore manager 905 may encrypt, backup and save the container configuration information. In operation block 1134, the backup and restore manager 905 may send a backup complete message to the cloud UI 1101 component. In operation block 1136, the cloud UI 1101 component may send a backup complete message to the user device 801.

With reference to FIG. 11C, in operation block 1140, the user device 801 may notify the hardware manager 903 that a USB device has been plugged in. This may be another device (e.g., another user device, Bluetooth device, etc.), hardware module (e.g., bluetooth, BLE, Zigbee, LorRa, etc.), etc. In operation block 1142, the hardware manager 903 may apply the container policy. In operation 1144, the hardware manager 903 may send a new hardware available message to the secure container platform 803. In operation 1146, the secure container platform 803 may send a new hardware in use message to the user device 801.

Edge computing has vast potential, and is becoming ever more important in the realization of the next generation of industrialization, running applications, and fostering innovation.

Current state-of-the-art networks use centralized access methods and solutions to communicate, compute and process data, typically via a cloud network. However, due to changes in demand for how data is consumed, there is a need to transition from centralized access methods and solutions to distributed access methods and solutions, which may be accomplished via edge computing.

Edge computing may be based on distributing computing, storage, and control services that are placed close to the end user devices. Edge computing solutions may put the correct amount compute resources at optimal points in the communication ecosystem, whether it is in the cloud, edge compute devices, or the end user devices. Edge computing solutions may implement a decentralized network architecture that brings the resources closer to where the data is being generated and consumed.

Edge computing in its basic form is already pervasive and being used extensively in products and solutions such as smart watches, streaming video, and smart homes. More and more content rich applications are being designed to run at the edge of the network. Content rich applications that demand low latency and high throughput may require access and compute resources at the edge of the network.

Edge computing enables applications to be run and executed at the network's edge. The definition of what is the network edge is dependent upon the ecosystem that the edge computing device is being placed within. Edge applications are meant to be run at the edge and not in a remote data center, facilitating quicker response times through lower latency and local computing power instead of relying on a cloud service. Typically, with edge devices, if there is congestion in an edge node, resources at the edge are allocated to help resolve the congestion (instead of failing over to a cloud resource). However, existing and conventional edge computing solutions generally rely on a centralized (not distributed) architecture approach. This centralized approach (centralized access method) is now undergoing a fundamental change where the edge (and not the core) is becoming the focus for content delivery and generation. These changes are forcing the industry to alter how it enables and delivers content while at the same time providing a secure environment from which to deliver and use the content.

Based on the specific edge computing needs, some embodiments may use a IoT stack with an agent, a container, and/or an application that is not in a container. In some embodiments, all three may share compute resources. Some embodiments may utilize containers on the ECG for microservices.

Containers are making a lot of headway into the wireless telecom space for valid reasons. Containers have many advantages that help enable the delivery of services for ECGs in addition to wireless operators with 4G and soon to be 5G environments. Containers have many unique and important advantages that can help with service delivery in 4G and 5G networks. Containers are becoming an important part of the overall edge network solution for 4G, 5G and beyond.

Containers enable separating a software application from the underlying infrastructure, making them infrastructure agnostic. Containers utilize virtual environments and there are several different types of containers that may be used. A service provider, enterprise, or utility using containers may deploy, replicate, move and/or backup processes and workloads faster and more efficiently than when utilizing virtual machines (VM) alone.

One of the more prolific container platforms that utilize a virtualized environment is Docker, which is based on the Linux operating system. Containers using Docker run in a virtual environment (e.g., a NFV, etc.) without the need of a hypervisor. Instead of utilizing a hypervisor, the container uses the host machine's kernel.

Containers may include many attributes. For example, containers are lightweight (e.g., only have what is needed, share the host kernel), scalable (e.g., orchestrator may automatically replicate containers), stackable (e.g., allows for stacking services) and portable (e.g., containers may be run locally, at the edge, or on a cloud).

One of the strengths of containers is that they allow for applications to be distributed, making them more efficient. The individual portions of the application in a distributed application are called services. For example, most video game software applications are made up of many components. As such, a video game application may include a service for an interface, a service for online collaboration, a service for storing application data to a database, and so forth. Previously these components of the application would be all in one vertical system and be bound together. However, by leveraging the distributed application approach using containers, the application may operate more efficiently with less resources being consumed.

Containers may be used for delivering services in a virtual distributed network (vDN). Containers using a vDN may deliver services to edge devices with low latency, facilitating mobile edge computing.

Containers may be considered lightweight because they only need the host machines kernel and not a hypervisor. This means that containers require fewer computing resources, making them ideal for use on a resource constrained ECG.

One important strength of containers is that they provide a common method to run code and/or an application, making them hardware agnostic and more efficient. One reason that containers are more efficient for running applications is that a container may decouple the application from the operating systems, thereby allowing for a more efficient deployment of the application. In other words, a user utilizing a container may run an application using only the resources it needs, instead of having additional resources assigned that it does not require to function (i.e., the "bloat").

A container may be designed to be isolated from other containers, such as by running the application entirely within itself. A fundamental key attribute of a container is that it shares the kernel of the host operating system (OS). Because the container shares the kernel, the container may be run on a host of environments without the worry of software dependencies. Everything needed by the application may be included in or accessible to the container.

Container environments (e.g., docker, kubernetes, k8s, k3s, etc.) may perform more functions than just enabling and running containers. A container environment or platform may allow for the creation and usage of images, networks, plug ins, and a host of other items. The container environment may allow wireless operators, enterprises and utilities to easily create applications, and ship them in containers that may be deployed anywhere.

As edge devices and their applications proliferate, it becomes increasingly important to secure and manage all of those devices. Without the ability to readily secure and manage edge devices, edge computing may not be accessible to many of the industrial applications to which it is most beneficial.

As the number of connected edge devices increases, so does the vulnerabilities at the edge of networks. These vulnerabilities may be exploited by hackers and other nefarious actors to launch cyberattacks. As such, it is important to develop and deploy systems and solutions that maintain container and edge device security.

Container security may differ from traditional security methods due to various factors, including the increased complexity and the fundamental dynamics of the container environment. For these and other reasons, effective container security solutions may require a wholistic approach, from the applications they contain to the infrastructure they run on.

An effective container security solution should be broad. This is because containers may include the container image, the running container, and all the linkages required to go from creating that image to getting it running on a computing device.

An effective container security solution may include the holistic application of processes, tools, and other relevant resources, with the aim of providing strong information security for any container-based system or workload.

In some embodiments, the container security solution may include a secure computing environment, which may include security enabled hardware and software divided into protection domains/portions. In some embodiments, the protection domains/portions may include unprivileged-normal portion, an unprivileged-secure portion, a privileged-normal portion, and a privileged-secure portion. The unprivileged portions may be within the user space of the operating system kernel, whereas the privileged portions may be within the kernel space of the operating system kernel. Both the user space and the kernel space may each include a secure portion and a non-secure portion.

The privileged-secure portion may include a monitor, a secure block system (SBS), trusted execution environment (TEE), secure services libraries, etc. The unprivileged-secure portion may include system application programming interfaces (APIs), a secure virtual private network (VPN), an encryption/decryption component, security hardware, a secure buffer suitable for communicating security-encrypted information generated in the unprivileged-secure portion to an electronic display, etc. The privileged-normal portion may include core elements of a high level operating system (HLOS) kernel, kernel APIs, drivers, and secure infrastructure (e.g., drivers for a secure operating system or TEE). The unprivileged-normal portion may include software applications, application frameworks, runtime libraries, a secure buffer configured to enable communication between various logical components and across protection domains/portions, etc.

Additionally, depending upon the complexity of the system, a Trusted Execution Environment as defined within the Global Platform standard can play a role to protect keys and other sensitive materials in the device by isolating them from the main execution environment.

Constant monitoring of deployed containers may ensure that they are being deployed correctly and/or sharing data correctly.

Container security is the protection of the integrity of containers. Container security needs to be integrated and continuous.

Container security involves: securing the container pipeline and the application, securing the container deployment environment(s) and infrastructure, and integrating with existing enterprise security tools and meeting or enhancing existing security policies.

Building security into the container pipeline (and the infrastructure it uses) allows the container, pipeline and corresponding infrastructure to be reliable, scalable, and trusted.

Containers may be created out of layers of files referred to as images. The base image is the most important for security purposes, because it is used as the starting point from which derivative images are created. As such, container security typically starts with finding and using trusted sources for the base image.

However even when using trusted images when adding applications and making configuration changes new variables are introduced that can produce security vulnerabilities for the container environment.

Items to be checked include (1) Confirming container images are signed and from a trusted source, (2) Runtime and operating system layers up to date, (3) What is the method and frequency of container updates, and (4) bug or problem identification and tracking.

After obtaining the images the access management of the container images is needed which includes protecting the images downloaded as well as those images which are built.

Integrate security testing and automate deployments requires that automation policies need to be created which flag builds with security issues, especially as new security vulnerabilities are found.

At a high level there are three key steps to creating a secure container image: (1) secure the code and its dependencies, (2) build up with a minimal base image from a trusted source, and (3) manage the tools and packages added to images throughout the development lifecycle.

Some embodiments may include or provide unique security enhancements for secure container environment containers using labels in the container Image JSON.

Some embodiments may include a computing device or system that includes or implements a secure container platform (e.g., platform 222 illustrated in FIG. 2).

In some embodiments, the secure container platform may be configured to use container labels to manage the configuration and security requirements, deploy services, and/or configure edge devices (e.g., ECGs 110, etc.).

In some embodiments, the secure container platform may be configured to use labels (instead of sysadmin) to configure devices, deploy containers, manage containers, or configure services.

In some embodiments, the secure container platform may be configured so that it is backwards compatible with an existing container specification and/or so that it may be run on a secure container environment operating in normal mode.

In some embodiments, the secure container platform may be configured to set rules to describe how the container should be deployed, set constraints for the access that the container has to local hardware, networking and resources, set APIs for the containers to interact with the management framework at the edge (and dynamically reconfigure their behavior based on the local environment) within the limitations on the above rules and constraints, use a multi-tenant execution environment so that containers can isolate or share resources (e.g., based on the above rules and constraints, as set by the original developer of the container, etc.), and implement security that encompasses the origin of the container, the integrity of the container image, and/or the validity the above rules, constraints, and execution environment.

Some embodiments may include installing, running, operating, performing or executing containers in a secure container environment in which a normal container may be run on a secure container platform and/or in which a default set of rules and constraints may be imposed/applied by the secure container platform.

In some embodiments, the secure container platform/environment may include registered developers and/or unregistered developers. The unregistered developers may be developers who do not have a license, have limited control developing images for containers that use any of the hardware devices in exclusive or co-operative mode (when such modes become available), are prevented from running containers as root, are prevented from running containers in privileged or host networking modes, are prevented from authenticated images, their images will not be hosted on any Veea platforms, and/or their images cannot be deployed via bootstrap.

In some embodiments, the secure container platform/environment may generate, include, issue or use licenses to access specific hardware types.

In some embodiments, the secure container platform/environment may generate, include, issue or use specific self-sign certificates for authentication of containers.

In some embodiments, the secure container platform may generate, include, create, or use authenticated containers that use hardware devices subject to the restrictions of their licenses.

In some embodiments, the secure container platform may generate, include, create, or use containers that run with privileges subject to the restrictions of their licenses.

In some embodiments, the secure container platform may be configured to allow any container release to be authenticated and traceable. The secure container platform may permit container images to be hosted on any supported platform (e.g., MAS, etc.). The secure container platform may permit containers to be deployed via bootstrap.

In some embodiments, the secure container platform may be configured to allow image validation and environment creation using software hooks to normal docker code.

In some embodiments, the secure container platform may include software for container creation, container start, and/or container exit. Container creation may include validating the container configuration and/or creating the user for the container. Container start may include repeating the validation of the container configuration (to ensure changes to the configuration are valid), notifying a hardware monitoring daemon to create the host secure container workspace directories and devices for the container bind mounts for /dev, /host and /sys, ensuring that the user is a member of the necessary groups for the devices that it needs to access, and/or ensuring that the security daemon has been reconfigured with the appropriate privileges for the container user. The container exit may include notifying a container monitoring daemon to clean up this container from the host secure container workspace.

In some embodiments, the secure container platform may be configured for dynamic delivery of device nodes into a container while running, which uses directory: /var/run/hmd, and/or in which a host can dynamically add or remove files, directories, device nodes, or even additional bind mounts within these directories and they will immediately appear within the container.

In some embodiments, the secure container platform may be configured to support, include or allow secure containers to implement parameter restrictions in an Image JSON. The image may include a default "Config" and "HostConfig" parameters for the container. Changes may be bounded so that a container cannot be run in a way that may cause it run incorrectly. Labels may match the "Env" rules. In some embodiments, the secure container platform may restrict the container from include any fields that do not exist as literal strings or templates in the image. In some embodiments, the secure container platform may restrict or prevent users from tampering with the list of volumes provided to the container. In some embodiments, the secure container platform may restrict or prevent users from changing the working directory for the container entry command.

Figure 12:
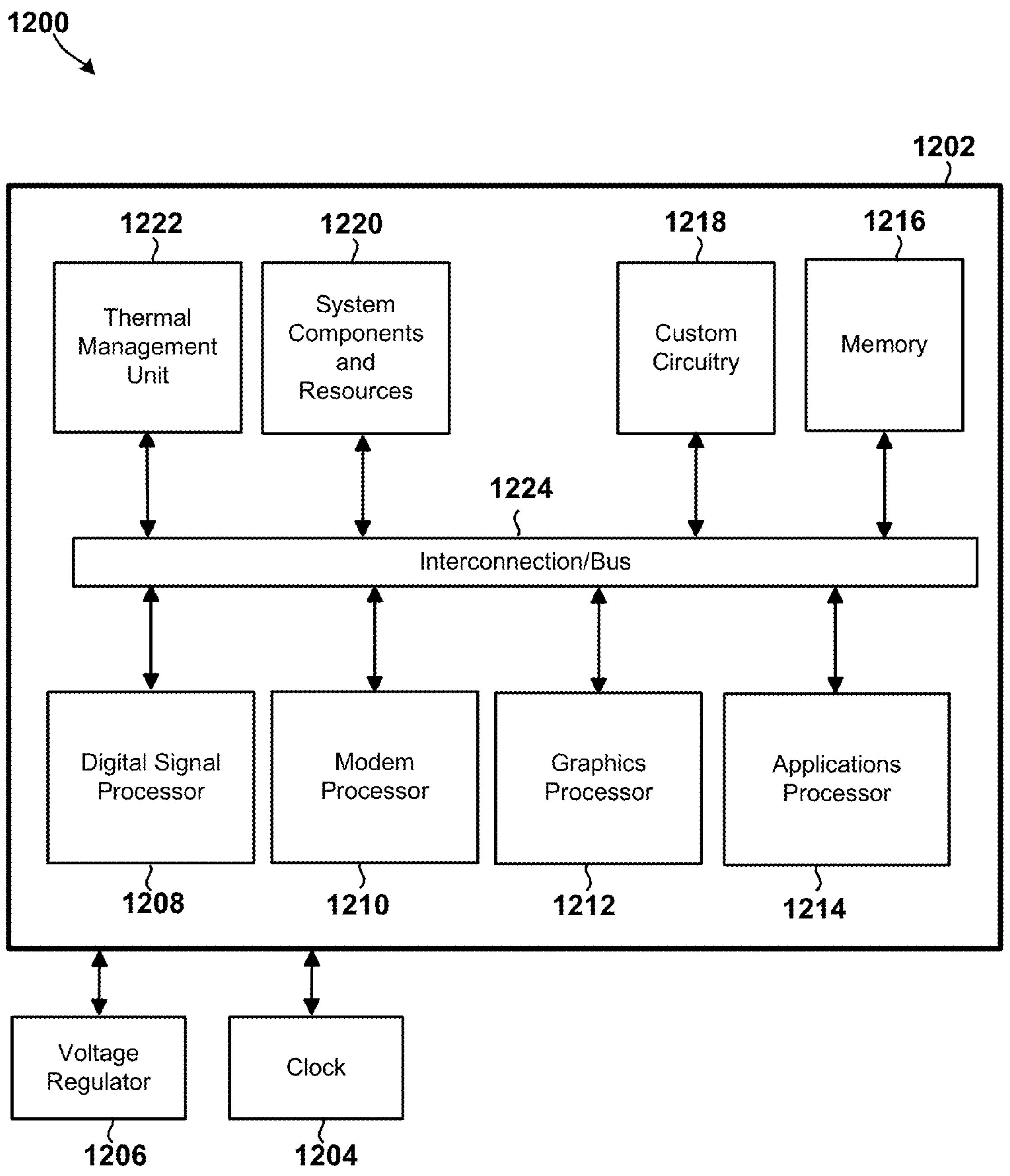
FIG. 12 is a component block diagram of a computing system that could be included in an edge device (e.g., ECG, etc.) and/or used to implement various embodiments.

FIG. 12 illustrates an example computing system 1200 suitable for implementing a secure container platform, executing secure containers, and/or implementing the various embodiments described above. In the example illustrated in FIG. 12, the computing system 1200 includes an SOC 1202, a clock 1204, and a voltage regulator 1206. The SOC 1202 may include a digital signal processor (DSP) 1208, a modem processor 1210, a graphics processor 1212, an application processor 1214 connected to one or more of the processors, memory 1216, custom circuitry 1218, system components and resources 1220, and a thermal management unit 1222, and a networks on chip (NOCs) module 1224. The SOC 1202 may operate as central processing unit (CPU) that carries out the instructions of software application programs by performing the arithmetic, logical, control and input/output (I/O) operations specified by the instructions.

The system components and resources 1220 and custom circuitry 1218 may manage sensor data, analog-to-digital conversions, wireless data transmissions, and perform other specialized operations, such as decoding data packets and processing video signals. For example, the system components and resources 1220 may include power amplifiers, voltage regulators, oscillators, phase-locked loops, peripheral bridges, temperature sensors (e.g., thermally sensitive resistors, negative temperature coefficient (NTC) thermistors, resistance temperature detectors (RTDs), thermocouples, etc.), semiconductor-based sensors, data controllers, memory controllers, system controllers, access ports, timers, and other similar components used to support the processors and software clients running on a device. The custom circuitry 1218 may also include circuitry to interface with other computing systems and peripheral devices, such as wireless communication devices, external memory chips, etc.

Each processor 1208, 1210, 1212, 1214 may include one or more cores, and each processor/core may perform operations independent of the other processors/cores. For example, the SOC 1202 may include a processor that executes a first type of operating system (e.g., FreeBSD, LINUX, OS X, macOS, etc.) and a processor that executes a second type of operating system (e.g., ANDROID, IOS, MICROSOFT WINDOWS 12, MICROSOFT SERVER 1903, etc.). In addition, any or all of the processors 1208, 1210, 1212, 1214 may be included as part of a processor cluster architecture (e.g., a synchronous processor cluster architecture, an asynchronous or heterogeneous processor cluster architecture, etc.).

The processors may be interconnected to one another and to the memory 1218, system components and resources 1220, and custom circuitry 1218, and the thermal management unit 1222 via high-performance networks-on chip (NoCs) 1224 or an interconnection/bus module. The NoCs 1224 or interconnection/bus module may include an array of reconfigurable logic gates and/or implement a bus architecture (e.g., CoreConnect, AMBA, etc.).

The SOC 1202 may further include an input/output module (not illustrated) for communicating with resources external to the SOC, such as the clock 1204 and the voltage regulator 1206. Resources external to the SOC (e.g., clock 1204, etc.) may be shared by two or more of the internal SOC processors/cores.

In addition to the SOC 1202 discussed above, the various embodiments may include or may be implemented in a wide variety of computing systems, which may include a single processor, multiple processors, multicore processors, or any combination thereof.

The processors may be any programmable microprocessor, microcomputer or multiple processor chip or chips that may be configured by software instructions (applications) to perform a variety of functions, including the functions of the various aspects described in this application. In some wireless devices, multiple processors may be provided, such as one processor dedicated to wireless communication functions and one processor dedicated to running other applications. Typically, software applications may be stored in the internal memory 906 before they are accessed and loaded into the processor. The processor may include internal memory sufficient to store the application software instructions.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for dynamic resource allocation across a distributed edge computing network, the method comprising:

establishing a distributed container network comprising a plurality of edge computing gateways (ECGs), wherein each ECG includes an orchestrator and containers, and the ECGs are interconnected via a network;

determining, by the orchestrator of a first ECG in the plurality of ECGs, available resources on one or more additional ECGs in the distributed container network;

selecting, by the orchestrator of the first ECG, a second ECG in the plurality of ECGs in the distributed container network to run a container based on the available resources;

reallocating, by the orchestrator of the first ECG, resources from the second ECG to run the container; and in response to changes in resource demands, dynamically reallocating, by the orchestrator of the first ECG, resources between the first ECG and the second ECG to adjust performance of the container.

2. The method of claim 1, further comprising maintaining access to a shared storage capability across the ECGs in the distributed container network to provide data persistence for applications running in containers.

3. The method of claim 1, further comprising deploying a compute distribution process across the ECGs in the distributed container network to horizontally scale the network by using newly available resources.

4. The method of claim 1, further comprising using a dynamic resource allocation scheme for the distributed container network to move a secure container application running on the distributed container network between different ECGs based on orchestration policies, wherein the application may be moved back to its original ECG when the resources on the original ECG are freed up.

5. The method of claim 1, further comprising using distributed computing capabilities within the distributed container network to dynamically reallocate applications between ECGs to offload tasks and improve resource distribution across multiple nodes.

6. The method of claim 1, wherein the orchestrator utilizes multiple wide area network (WAN) connections from different ECGs in the distributed container network to provide upstream connectivity to a cloud network, wherein the WAN connections are aggregated to increase bandwidth or provide alternative paths for application communication.

7. The method of claim 1, further comprising reassigning containers or applications between ECGs in response to hardware failures, network congestion, or resource shortages.

8. The method of claim 1, wherein the orchestrator is configured to operate using an orchestration platform selected from a platform group comprising Kubernetes (K8), Docker Swarm, and K3S.

9. The method of claim 1, wherein the orchestrator determines and applies real-time orchestration policies based on resource availability and workload demands, wherein the orchestration policies govern movement of applications between ECGs to enhance performance across the distributed container network.

10. An edge computing gateway (ECG), comprising:

a processor configured with processor-executable instructions to:

establish a distributed container network comprising a plurality of ECGs, wherein each ECG includes an orchestrator and containers, and the ECGs are interconnected via a network;

determine, by the orchestrator of the ECG, available resources on one or more additional ECGs in the distributed container network;

select one of the additional ECGs in the distributed container network to run a container based on the available resources determined by the orchestrator of the ECG;

allocate resources from the selected ECG to execute the container; and in response to changes in resource demands, dynamically reallocate resources between the ECG and the selected ECG to adjust container performance across the distributed container network.

11. The ECG of claim 10, wherein the processor is further configured to maintain access to a shared storage capability across the ECGs in the distributed container network to provide data persistence for applications running in containers.

12. The ECG of claim 10, wherein the processor is further configured to deploy a compute distribution process across the ECGs in the distributed container network to horizontally scale the network by using newly available resources.

13. The ECG of claim 10, wherein the processor is further configured to use a dynamic resource allocation scheme for the distributed container network to move a secure container application running on the distributed container network between different ECGs based on orchestration policies, wherein the application may be moved back to its original ECG when the resources on the original ECG are freed up.

14. The ECG of claim 10, wherein the processor is further configured to use distributed computing capabilities within the distributed container network to dynamically reallocate applications between ECGs to offload tasks and improve resource distribution across multiple nodes.

15. The ECG of claim 10, wherein the processor is further configured to use multiple wide area network (WAN) connections from different ECGs in the distributed container network to provide upstream connectivity to a cloud network, wherein the WAN connections are aggregated to increase bandwidth or provide alternative paths for application communication.

16. The ECG of claim 10, wherein the processor is further configured to reassign containers or applications between ECGs in response to hardware failures, network congestion, or resource shortages.

17. The ECG of claim 10, wherein the processor is further configured to operate the orchestrator using an orchestration platform selected from a platform group comprising Kubernetes (K8), Docker Swarm, and K3S.

18. The ECG of claim 10, wherein the processor is further configured to determine and apply real-time orchestration policies based on resource availability and workload demands, wherein the orchestration policies govern movement of applications between ECGs to enhance performance across the distributed container network.

19. A non-transitory computer readable storage medium having stored thereon processor-executable software instructions configured to cause a processor in an edge computing gateway (ECG) to perform operations for dynamic resource allocation across a distributed edge computing network, the operations comprising:

establishing a distributed container network comprising a plurality of edge computing gateways (ECGs), wherein each ECG includes an orchestrator and containers, and the ECGs are interconnected via a network;

determining, by the orchestrator of a first ECG, available resources on one or more additional ECGs in the distributed container network;

selecting, by the orchestrator of the first ECG, a second ECG in the distributed container network to run a container based on the available resources;

reallocating resources from the second ECG to run the container, wherein the orchestrator determines an appropriate node to adjust resource utilization; and in response to changes in resource demands, dynamically reallocating resources between the first ECG and the second ECG to adjust performance of the container.

20. The non-transitory computer readable storage medium of claim 19, wherein the stored processor-executable instructions are configured to cause the processor in the ECG to perform operations further comprising maintaining access to a shared storage capability across the ECGs in the distributed container network to provide data persistence for applications running in containers.

21. The non-transitory computer readable storage medium of claim 19, wherein the stored processor-executable instructions are configured to cause the processor in the ECG to perform operations further comprising deploying a compute distribution process across the ECGs in the distributed container network to horizontally scale the network by using newly available resources.

22. The non-transitory computer readable storage medium of claim 19, wherein the stored processor-executable instructions are configured to cause the processor in the ECG to perform operations further comprising using a dynamic resource allocation scheme for the distributed container network to move a secure container application running on the distributed container network between different ECGs based on orchestration policies, wherein the application may be moved back to its original ECG when the resources on the original ECG are freed up.

23. The non-transitory computer readable storage medium of claim 19, wherein the stored processor-executable instructions are configured to cause the processor in the ECG to perform operations further comprising using distributed computing capabilities within the distributed container network to dynamically reallocate applications between ECGs to offload tasks and improve resource distribution across multiple nodes.

24. The non-transitory computer readable storage medium of claim 19, wherein the stored processor-executable instructions are configured to cause the processor in the ECG to perform operations further comprising using multiple wide area network (WAN) connections from different ECGs in the distributed container network to provide upstream connectivity to a cloud network, wherein the WAN connections are aggregated to increase bandwidth or provide alternative paths for application communication.

25. The non-transitory computer readable storage medium of claim 19, wherein the stored processor-executable instructions are configured to cause the processor in the ECG to perform operations further comprising reassigning containers or applications between ECGs in response to hardware failures, network congestion, or resource shortages.

26. The non-transitory computer readable storage medium of claim 19, wherein the stored processor-executable instructions are configured to cause the processor in the ECG to perform operations further comprising operate the orchestrator using an orchestration platform selected from a platform group comprising Kubernetes (K8), Docker Swarm, and K3S.

27. The non-transitory computer readable storage medium of claim 19, wherein the stored processor-executable instructions are configured to cause the processor in the ECG to perform operations further comprising determining and applying real-time orchestration policies based on resource availability and workload demands, wherein the orchestration policies govern movement of applications between ECGs to enhance performance across the distributed container network.

* * * * *